United States Patent
Glenn et al.

(10) Patent No.: US 6,954,526 B1
(45) Date of Patent: Oct. 11, 2005

(54) METHODS AND SYSTEMS FOR ROUTING CALLING NAME SERVICE QUERY MESSAGES IN A COMMUNICATION NETWORK

(75) Inventors: Dean Douglas Glenn, Cary, NC (US); Peter Joseph Marsico, Carrboro, NC (US)

(73) Assignee: Tekelec, Calabasas, CA (US)

( * ) Notice: Subject to any disclaimer, the term of this patent is extended or adjusted under 35 U.S.C. 154(b) by 0 days.

(21) Appl. No.: 09/534,281

(22) Filed: Mar. 24, 2000

Related U.S. Application Data

(60) Provisional application No. 60/127,889, filed on Apr. 5, 1999.

(51) Int. Cl.[7] ............................................. H04M 7/44
(52) U.S. Cl. ............................. 379/220.01; 379/207.15; 379/221.09
(58) Field of Search ............................ 379/219, 220.01, 379/221.08, 221.09, 221.1, 221.13, 207.15, 207.02

(56) References Cited

U.S. PATENT DOCUMENTS

| | | |
|---|---|---|
| 5,142,622 A | 8/1992 | Owens |
| 5,208,811 A | 5/1993 | Kashio et al. |
| 5,239,542 A | 8/1993 | Breidenstein et al. |
| 5,315,641 A | 5/1994 | Montgomery et al. |
| 5,384,840 A | 1/1995 | Blatchford et al. |
| 5,420,916 A | 5/1995 | Sekiguchi |
| 5,430,727 A | 7/1995 | Callon |
| 5,509,010 A | 4/1996 | La Porta et al. |
| 5,568,487 A | 10/1996 | Sitbon et al. |
| 5,581,558 A | 12/1996 | Horney, II et al. |
| 5,583,927 A | 12/1996 | Ely et al. |
| 5,586,177 A | 12/1996 | Farris et al. |
| 5,638,431 A | 6/1997 | Everett et al. |

(Continued)

FOREIGN PATENT DOCUMENTS

| | | |
|---|---|---|
| CA | 2239764 | 12/1998 |
| WO | WO 97/42776 A2 | 11/1997 |
| WO | WO 98/28897 A1 | 7/1998 |
| WO | WO 99/09759 A1 | 2/1999 |

OTHER PUBLICATIONS

"Eagle® Feature Guide," Publication PN/9110–1225–01, Rev. B, Tekelec (Jan., 1998).
"Eagle® STP Platform," Publication 908–0126–01, Rev. A, Tekelec (1997).
"Eagle® STP LAN Interface Feature," Publication 908–0134–01, Rev. B, Tekelec (1997).
"Eagle® STP Database Transport Access Feature," Publication 908–0136–01, Rev. B, Tekelec (1997).

(Continued)

*Primary Examiner*—Creighton Smith
(74) *Attorney, Agent, or Firm*—Jenkins, Wilson & Taylor P.A.

(57) ABSTRACT

A network element for routing a calling name (CNAM) query message through a communications network includes a communication module capable of receiving a CNAM query message from and transmitting the CNAM query message to a communications network. A CNAM query routing information database stores CNAM query routing information for at least one CNAM database. A CNAM query routing address translation process performs a lookup in the CNAM query routing information database based on information contained in the query message and determines whether to route the query message to a national CNAM database based on results from the database lookup.

77 Claims, 11 Drawing Sheets

U.S. PATENT DOCUMENTS

| | | |
|---|---|---|
| 5,640,446 A | 6/1997 | Everett et al. |
| 5,651,002 A | 7/1997 | Van Seters et al. |
| 5,657,452 A | 8/1997 | Kralowetz et al. |
| 5,664,102 A | 9/1997 | Faynberg |
| 5,675,635 A | 10/1997 | Vos et al. |
| 5,680,552 A | 10/1997 | Netravali et al. |
| 5,696,809 A | 12/1997 | Voit |
| 5,706,286 A | 1/1998 | Reiman et al. |
| 5,712,903 A | 1/1998 | Bartholomew et al. |
| 5,740,374 A | 4/1998 | Raffali-Schreinemachers |
| 5,761,281 A | 6/1998 | Baum et al. |
| 5,761,500 A | 6/1998 | Gallant et al. |
| 5,764,750 A | 6/1998 | Chau et al. |
| 5,764,955 A | 6/1998 | Doolan |
| 5,768,525 A | 6/1998 | Kralowetz et al. |
| 5,781,534 A | 7/1998 | Perlman et al. |
| 5,802,285 A | 9/1998 | Hirviniemi |
| 5,805,587 A | 9/1998 | Norris et al. |
| 5,809,028 A | 9/1998 | Nethercott et al. |
| 5,812,781 A | 9/1998 | Fahlman et al. |
| 5,815,669 A | 9/1998 | Lee et al. |
| 5,828,844 A | 10/1998 | Civanlar et al. |
| 5,838,782 A | 11/1998 | Lindquist |
| 5,852,660 A | 12/1998 | Lindquist et al. |
| 5,867,495 A | 2/1999 | Elliott et al. |
| 5,870,565 A | 2/1999 | Glitho |
| 5,872,782 A | 2/1999 | Dendi |
| 5,878,129 A | 3/1999 | Figurski et al. |
| 5,903,636 A * | 5/1999 | Malik .................... 379/142.01 |
| 5,920,562 A | 7/1999 | Christie et al. |
| 5,949,865 A * | 9/1999 | Fusinato ................ 379/221.09 |
| 5,958,016 A | 9/1999 | Chang et al. |
| 5,974,052 A | 10/1999 | Johnson et al. |
| 6,006,098 A | 12/1999 | Rathnasabapathy et al. |
| 6,011,803 A | 1/2000 | Bicknell et al. |
| 6,014,379 A | 1/2000 | White et al. |
| 6,018,515 A | 1/2000 | Sorber |
| 6,021,126 A | 2/2000 | White |
| 6,023,502 A | 2/2000 | Bouanaka |
| 6,028,921 A * | 2/2000 | Malik et al. ........... 379/201.04 |
| 6,055,302 A | 4/2000 | Schmersel et al. |
| 6,064,653 A | 5/2000 | Farris |
| 6,067,546 A | 5/2000 | Lund |
| 6,069,890 A | 5/2000 | White et al. |
| 6,078,582 A | 6/2000 | Curry et al. |
| 6,084,892 A | 7/2000 | Benash et al. |
| 6,084,956 A | 7/2000 | Turner et al. |
| 6,094,437 A | 7/2000 | Loehndorf, Jr. et al. |
| 6,097,719 A | 8/2000 | Benash et al. |
| 6,097,805 A | 8/2000 | Figurski et al. |
| 6,112,090 A | 8/2000 | Valentine |
| 6,115,383 A | 9/2000 | Bell et al. |
| 6,122,255 A | 9/2000 | Bartholomew et al. |
| 6,122,365 A | 9/2000 | Yegoshin |
| 6,134,235 A | 10/2000 | Goldman et al. |
| 6,144,667 A | 11/2000 | Doshi et al. |
| 6,144,670 A | 11/2000 | Sponaugle et al. |
| 6,151,390 A | 11/2000 | Volftsun et al. |
| 6,154,467 A | 11/2000 | Hager et al. |
| 6,157,710 A | 12/2000 | Figurski et al. |
| 6,195,425 B1 | 2/2001 | Farris |
| 6,584,190 B1 | 6/2003 | Bressler |
| 6,714,639 B1 * | 3/2004 | Bedingfield et al. ... 379/221.13 |
| 6,748,069 B1 * | 6/2004 | Nimmagadda et al. 379/201.07 |

OTHER PUBLICATIONS

"Eagle® STP X.25 to SS7–IS.41 Protocol Conversion Features," Publication 908–0135–01, Rev. B, Tekelec (1997).
"Eagle® STP ANSI–ITU Gateway Feature," Publication 908–0133–01, Rev. B, Tekelec (1997).
"SS7–Frame Relay Access Device SS7 Protocol Information Translator," Publication 908–0167–01, Rev. A, Tekelec (1997).
O'Shea, "Mating Season," Telephony, p. 10–11, (Sep. 20, 1999).
O'Shea, "The Network that's Never Done," Telephony, p. 38–43, (Sep. 15, 1997).
Snyder, "Rerouting Internet Traffic James," Telephony, p. 12, (Nov. 11, 1996).
Snyder, "Branded with Optics," Telephony, p. 49–50. (Jul. 22, 1996).
Anonymous, "Around the Loop," Telephony, p. 26, (Jul. 22, 1996).
Michael McGrew, "Transport SS7 Signaling Over IP," Lucent Technologies, Inc., p. 1–8, (Nov. 1998).
Official Action of the European Patent Office for EP Application No. 00919614.8–2413 (Nov. 10, 2004).
Official Action of the European Patent Office for EP Application No. 00919614.8–2413 (Nov. 17, 2003).
Supplementary Partial European Search Report for EP Application No. 00919614.8–2413 (Mar. 21, 2003).
Notification of Transmittal of International Preliminary Examination Report for International Application No. PCT/US00/07876 (Mar. 27, 2001).
Notification of Transmittal of the International Search Report or the Declaration for International Application No. PCT/US00/07876 (Jun. 21, 2000).
O'Shea, "Mating Season", Telephony, pp. 10–11 (Sep. 20, 1999).
Tekelec, "Eagle ® Feature Guide," Publication PN/9110–1225–01, Rev. B (Jan. 1998).
O'Shea, "The Network that's Never Done", Telephony, pp. 38–43 (Sep. 15, 1997).
Tekelec, "Eagle ® STP Platform," Publication 908–0126–01, Rev. A (1997).
Tekelec, "Eagle ® STP LAN Interface Feature," Publication 908–0134–01, Rev. B (1997).
Tekelec, "Eagle ® STP Database Transport Access Feature," Publication 908–0136–01, Rev. B (1997).
Tekelec, "Eagle ® STP X.25 to SS7–IS.41 Protocol Conversion Feature," Publication 908–0135–01, Rev. B (1997).
Tekelec, "Eagle ® STP ANSI–ITU Gateway Feature," Publication 908–0133–01, Rev. B (1997).
Tekelec, "SS7–Frame Relay Access Device SS7 Protocol Information Translator," Publication 908–0167–01, Rev. A (1997).
Snyder, "Reroutin Internet Traffic Jams", Telephony, p. 12 (Nov. 11, 1996).
Snyder, "Branded with Optics", Telephony, pp. 49–50 (Jul. 22, 1996).
Anonymous, "Around the Loop", Telephony, p. 26 (Jul. 22, 1996).

* cited by examiner

ECD DATABASE — 524

| KEY | DATA FIELDS |||||
|---|---|---|---|---|---|
| CgPA:ADD | DPC | SSN | RI | Host | Port |
| 9194605500 | - | - | - | 1.1.25.12 | 34 |
| 9198595637 | 2-1-1 | 20 | SSN | - | - |
| 7106675731 | 2-1-1 | 20 | SSN | - | - |
| 9194602322 | - | - | - | 1.1.25.12 | 34 |

Figure 4a

GTT DATABASE — 526

| KEY RANGE | DATA FIELDS |||||
|---|---|---|---|---|---|
| CgPA:ADD Range | DPC | SSN | RI | Host | Port |
| 9194600000 - 9194609999 | 2-1-1 | 20 | SSN | - | - |
| 9198590000 - 9198599999 | - | - | - | 1.1.25.12 | 34 |
| 910******** - 910******** | - | - | - | 1.1.25.12 | 34 |
| 7********* - 7********* | - | - | - | 1.1.25.12 | 34 |

METHODS AND SYSTEMS FOR ROUTING CALLING NAME SERVICE QUERY MESSAGES IN A COMMUNICATION NETWORK

RELATED APPLICATION INFORMATION

This application claims the benefit of U.S. Provisional Patent Application Ser. No. 60/127,889 filed Apr. 5, 1999, the disclosure of which is incorporated herein by reference in its entirety.

TECHNICAL FIELD

The present invention relates to the routing of signaling messages in a communications network, and more particularly to methods and systems for routing signaling messages associated with a request for calling name service.

BACKGROUND ART

The development and widespread implementation of Common Channel Signaling (CCS) technology over the past several decades has made possible many, if not all, of the advanced or "intelligent" services typically associated with modern telephony networks. Because CCS-based telecommunication network architectures employ a signaling network that is distinct and separate from the communication network used to carry voice-related information, many of the problems associated with direct current (DC) signaling and signaling within the voice band (in-band signaling) are no longer present in modem telecommunication networks. An in-depth discussion of CCS network technology and the evolution of telecommunication networking can be found in Signaling System #7, Second Edition, January 1998, published by McGraw-Hill.

With regard to the advanced or "intelligent" services mentioned above, it will be appreciated that such Advanced Intelligent Network (AIN)-type customer services include, but are not limited to Find Me service; Follow Me service; Computer Security service; Call Pickup service; Store Locator service; Call Waiting service; Call Block service; Three Way Calling service; 800 number services; and Calling Name (CNAM) Delivery service.

Find Me service allows a customer's calls to be forwarded to another location. The difference between this feature and current call forwarding functionality is the ability to screen unwanted calls from forwarding. Only authorized callers are forwarded to the new location. Similarly, Follow Me service allows a number to be forwarded on a time schedule. The subscriber determines the time forwarding is to take place when the feature is invoked. Destinations can include both wired and wireless telephones or handsets.

Computer Security service allows subscribers to prevent unauthorized callers from accessing a computer via modem. Only callers with the authorized access code or calling from an authorized number can access the computer. The SS7 network delivers the calling party number to the destination end office. This number is then checked in a database located with a Service Control Point (SCP), and, if authorized, is allowed, to connect with the modem. With Call Pickup service, when a call is placed to a number and is unanswered, the called party can be paged via radio pager. The called party can then dial a code from any telephone at any location and immediately be connected with the waiting caller. With regard to paging type services, manufacturers of such Personal Communications Services (PCS) devices have to date developed two-way pagers that connect a caller with the party being paged. The pager is a two-way transceiver capable of receiving calls (pages) and connecting the caller with the paged party.

Store Locator service allows businesses to advertise one number, and have callers automatically transferred to the nearest location based on the caller's telephone number. This allows businesses to advertise nationwide for all locations without special ads that are region specific. The calling party number is matched in a routing database located at a Service Control Point (SCP) and the SCP provides the end office with the routing instructions based on the calling party number. With Call Routing service, businesses can reroute calls during periods of excessively high call volumes or after business hours.

Of particular interest with regard to the invention disclosed and described herein, is Calling Name (CNAM) Delivery service. With Calling Name Delivery service, the name of the calling party is retrieved from a database and presented to the called party. Such a service effectively allows business and residential subscribers to screen incoming calls by reading the name of the calling party on a display built into the telephone set, or on an adjunct device. This provides subscribers with the ability to better manage interruptions and multiple calls. Businesses can provide priority to preferred callers, while residential customers can decide which calls to answer immediately, and which to send to their answering machine or voice messaging service.

From the standpoint of a service provider or carrier, CNAM service has both positive and negative economic considerations. Customers desire the convenience of such a feature, and are therefor willing to pay a modest fee for the service. However, off-setting the customer fee-based revenue stream is the expense associated with obtaining the calling party information required to provide the CNAM service.

Shown in FIG. 1 is a telecommunications network diagram illustrating a typical configuration employed by service providers provisioned to provide CNAM service to their customers. As such, FIG. 1 includes a telecommunication network, generally indicated by the numeral 100. Explicitly shown in Network 100 is a calling party (CgPA) 102 and a called party (CdPA) 104. Calling party 102 is communicatively coupled to an End Office (EO) or Service Switching Point (SSP) 106, while called party 104 is similarly coupled to an SSP 108. Network 100 further includes a number of Signal Transfer Points (STPs) which are owned and operated by different service providers. More particularly, network 100 includes STPs 110, 114, and 118 that are owned by Bell South, Illuminet, and Bell Atlantic, respectively. All of these STPs are connected either directly or indirectly via Signaling System 7 (SS7) links that collectively comprise the Public Switched Telephone Network (PSTN) SS7 network 116. As further indicated in FIG. 1, STP 110 is locally connected to an SCP node 112 that contains CNAM-type information associated with customers serviced by Bell South. Similarly, STP 118 is locally connected to an SCP node 120 that contains CNAM-type information associated with customers serviced by Bell Atlantic.

It will be appreciated that placing a call involves connecting a calling party to a called party, and this is typically accomplished through the use of a CCS SS7 signaling network and a sequence of SS7 call control messages. With particular regard to CNAM delivery service, it will be appreciated by those skilled in the art of SS7 signaling that the SSP servicing the called party is required to formulate and launch an SS7 query requesting CNAM information associated with the calling party. Such calling party information is typically stored In SCP database nodes that are connected to the SS7 signaling network.

As such, it will be further appreciated that in the event that a calling party is serviced by the same carrier as the called party, then the required CNAM information can likely be found in a local CNAM database or SCP owned by the carrier. In such a case, the carrier would not be charged by a competitor for access to the required CNAM information, since the carrier owns the CNAM database that contains the required calling party information. However, if the calling party is serviced by a carrier other than the carrier servicing the called party, then there will likely be a cost associated with obtaining the required CNAM information. In practice, carriers typically charge one another access fees that are based on the number of CNAM queries received or CNAM database dips performed during a given time period.

The latter scenario is specifically illustrated in FIG. 1. In this case, calling party 102 is a customer of Bell South, while called party 104 is serviced by Bell Atlantic. As such, when SSP 108 is notified via an SS7 call setup message that calling party 102 is requesting a connection with called party 104, a CNAM query must be sent through the SS7 network to the CNAM SCP 112 owned by the calling party's carrier, Bell South. It will also be appreciated that, in route to CNAM SCP 112, the CNAM query message is switched through the hub provider (Illuminet) owned STP 114. Consequently, in order to provide the called party 104 with Calling Name delivery service, the called party's carrier (Bell Atlantic) must pay CNAM query routing and processing related fees to both the hub provider (Illuminet) and the calling party's carrier (Bell South).

It will also be appreciated that as the porting of customers (i.e., local number portability & mobile number portability) becomes more prevalent within telecommunication networks, the process of obtaining CNAM information from competing carriers will simultaneously become more complicated, more prone to failure, and potentially more expensive. In such a case, the called party carrier must first identify the competing carrier that services or "owns" the calling party. In some cases, this may require pay-per-use access to a number portability database, and consequently an increased overall cost associated with the providing of inter-service-provider CNAM service.

Therefore, what is needed is a system and method of accessing CNAM information for any calling party that does not require the accessing of carrier specific CNAM databases.

DISCLOSURE OF THE INVENTION

According to one aspect, the present invention includes a communications network element that is capable of generally routing messages and also identifying a CNAM-type query message and determining whether the query can be processed via a local CNAM database or whether the query must be routed to and processed by a national CNAM database. The CNAM routing node includes a communication module or modules capable of transmitting and receiving data packets over both SS7 and IP networks. A message discrimination process examines incoming data packets and subsequently directs certain query packets to a CNAM routing translation system which administers database lookup, and subsequent query routing address modifications.

The functions for providing CNAM routing translation system are described herein as modules or processes. It is understood that these modules or processes may be implemented as computer-executable instructions embodied in a computer-readable medium. Alternatively, the modules or processes described herein may be implemented entirely in hardware. In yet another alternative embodiment, the modules or processes described herein may be implemented as a combination of hardware and software.

The processes and modules for providing CNAM routing translation functionality are described below as being associated with cards or subsystems within a routing node. It is understood that these cards or subsystems include hardware for storing and executing the processes and modules. For example, each card or subsystems described below may include one or more microprocessors, such as an x86 microprocessor available from Intel Corp., and associated memory.

Accordingly, it is an object of the present invention to provide a routing node that is capable of routing an incoming Calling Name (CNAM) query message to a national CNAM database.

It is yet another object of the present invention to provide a routing node that that is capable of routing an incoming Calling Name (CNAM) query message to a national CNAM database over an Internet Protocol (IP) network using IP encapsulated Signaling System 7 (SS7) query messages.

It is yet another object of the present invention to provide a routing node that that is capable of receiving an incoming Calling Name (CNAM) query message, determining whether the customer associated with the query message is one that is serviced by a carrier that owns the routing node, and routing the query to either a local CNAM database owned by the carrier or to a national CNAM database.

It is yet another object of the present invention to provide a method whereby a telecommunication carrier can obtain Calling Name (CNAM) information for a customer serviced by a competing carrier without requiring access to a CNAM database owned by the competing carrier.

It is yet another object of the present invention to provide a method whereby a telecommunication carrier can obtain Calling Name (CNAM) information from a centralized national CNAM database.

It is yet another object of the present invention to provide a method whereby a telecommunication carrier can obtain Calling Name (CNAM) information from a centralized national CNAM database using IP encapsulated SS7 query messages.

It is yet another object of the present invention to provide a method of eliminating the need for SS7 network point codes associated with CNAM SCP nodes.

It is yet another object of the present invention to provide a method of creating a virtual CNAM SCP that is comprised of multiple CNAM SCP databases, wherein the virtual CNAM SCP is assigned a single SS7 network point code.

It is yet another object of the present invention to provide a method of allowing all messages requiring CNAM SCP service to be addressed to an SS7 point code that is the same as the SS7 point code of a router of the present invention.

It is yet another object of the present invention to provide a method of allowing CNAM query messages to be routed based on the carder that owns or services the calling party associated with the CNAM query. Some of the objects of the invention having been stated hereinabove, other objects will become evident as the description proceeds, when taken in connection with the accompanying drawings as best described hereinbelow.

Some of the objects of the invention having been stated hereinabove, other objects will be evident as the description proceeds, when taken in connection with the accompanying drawings as best described hereinbelow.

BRIEF DESCRIPTION OF THE DRAWINGS

Embodiments of the present invention will now be explained with reference to the accompanying drawings, of which:

FIG. 4a is a table that illustrates a sample Exceptions-based CNAM routing Database (ECD) structure used in a preferred embodiment of a CNAM routing node of the present invention;

FIG. 4b is a table that illustrates a sample range-based Global Title Translation (GTT) routing database structure used in a preferred embodiment of a CNAM routing node of the present invention;

DETAILED DESCRIPTION OF THE INVENTION

Figure 1:
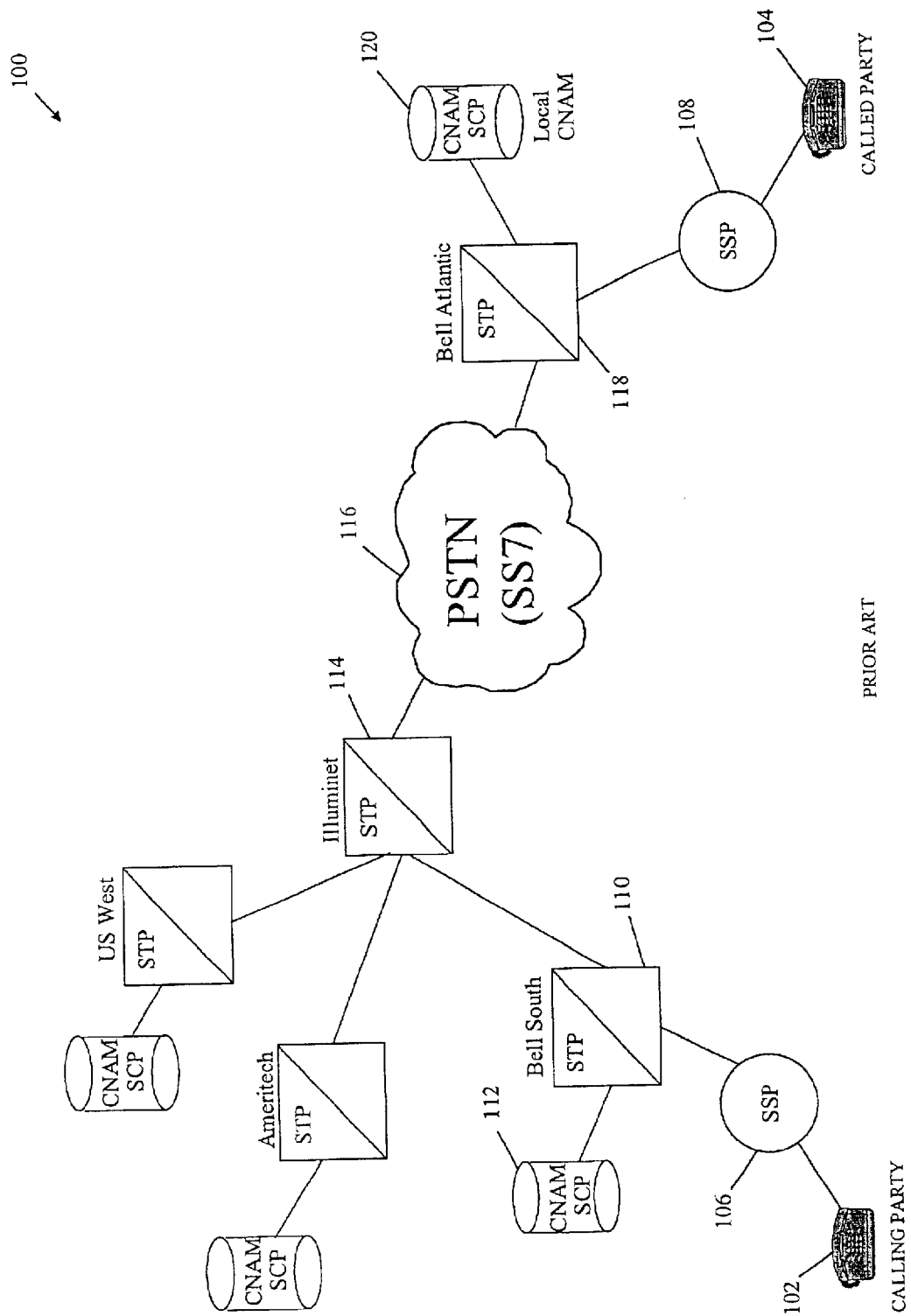
FIG. 1 is a network diagram illustrating a prior art network architecture that supports Calling Name (CNAM) delivery service.
Figure 2:
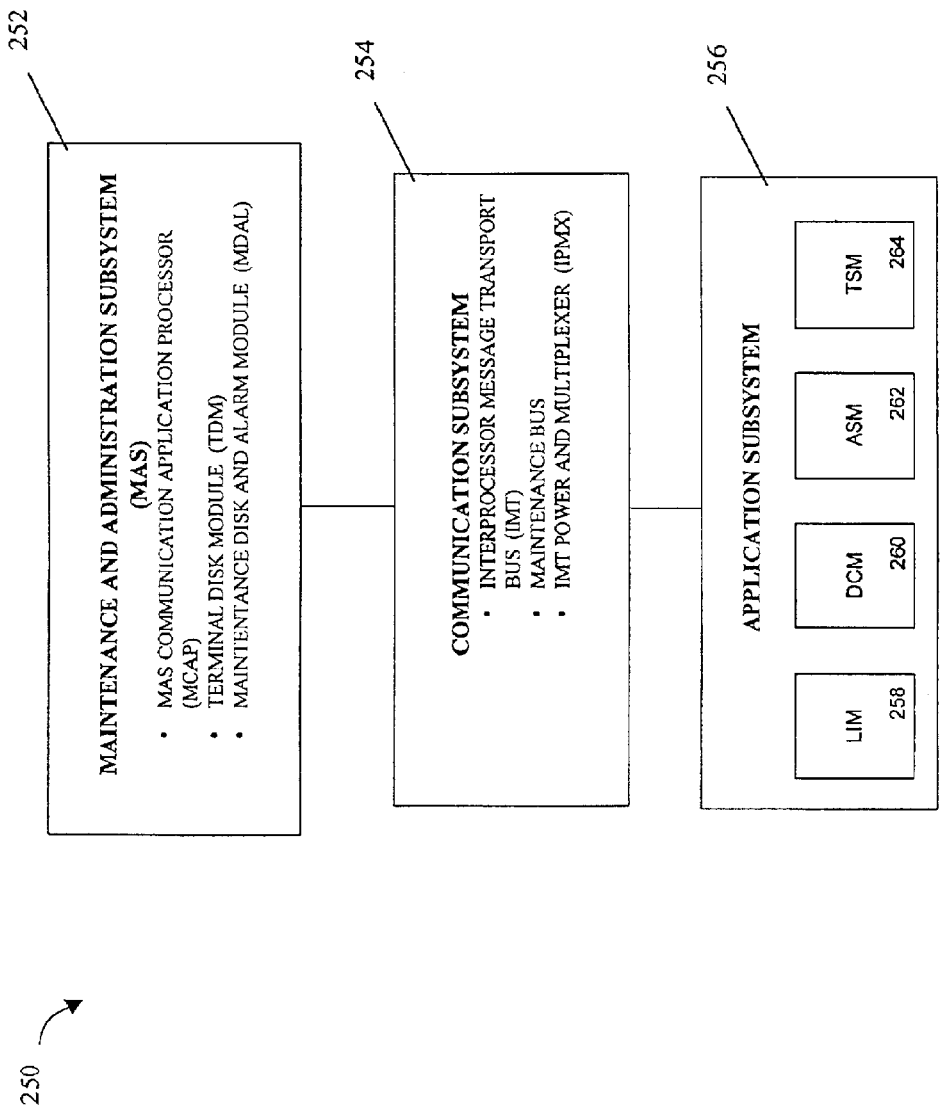
FIG. 2 is a schematic diagram of an STP switching node.

Disclosed herein are several embodiments of the present invention, all of which include a network element that performs functions similar to that of a traditional telecommunications network packet routing switch, such as a Signal Transfer Point (STP). Each of the embodiments described and discussed below, employs an internal architecture similar to that of high performance STP and signaling gateway (SG) products which are marketed by the assignee of the present application as the Eagle® STP and IP7 Secure Gateway™, respectively. A block diagram that generally illustrates the base internal architecture of the Eagle® STP product is shown in FIG. 2. A detailed description of the Eagle® STP may be found in the *Eagle® Feature Guide* PN/910-1225-01, Rev. B, January 1998, published by Tekelec Inc. of Calabasas, Calif., the disclosure of which is incorporated herein by reference in its entirety. Similarly, a detailed description of the IP$^7$ Secure Gateway™ may be found in Tekelec publication PN/909-0767-01, Rev B, August 1999, titled *Feature Notice IP$^7$ Secure Gateway™ Release* 1.0, the disclosure of which is hereby incorporated by reference in its entirety. The specific functional components of an IP$^7$ Secure Gateway™ for transmitting and receiving TCAP messages over an Internet Protocol (IP) network are described in commonly-assigned, co-pending U.S. patent application Ser. No. 09/205,809 filed Dec. 4, 1998, the disclosure of which is incorporated herein by reference in its entirety. As described in the above referenced *Eagle® Feature Guide*, an Eagle® STP 250 includes the following subsystems: a Maintenance and Administration Subsystem (MAS) 252, a communication subsystem 254 and an application subsystem 256. The MAS 252 provides maintenance communications, initial program load, peripheral services, alarm processing and system disks. The communication subsystem 254 includes an Interprocessor Message Transport (IMT) bus that is the main communication bus among all subsystems in the Eagle® STP 250. This high-speed communications system functions as two 125 Mbps counter-rotating serial buses.

The application subsystem 256 includes application cards that are capable of communicating with the other cards through the IMT buses. Numerous types of application cards can be incorporated into STP 250, including: a Link Interface Module (LIM) 258 that provides SS7 links and X.25 links, a Application Communication Module (ACM) 260 that provides a TCP/IP interface over Ethernet, and an Application Service Module (ASM) 262 that provides global title translation, gateway screening and other services. A Translation Service Module (TSM) 264 may also be provided to support triggered local number portability service. Once again, a detailed description of the Eagle® STP is provided in the above cited *Eagle® Feature Guide* and need not be described in detail herein. It should also be appreciated that, in addition to conventional SS7 LIM cards, a Database Communication Module (DCM) can be employed in a similar manner to provide for the transport of Internet Protocol (IP) encapsulated SS7 messages over an IP network, as described in the above referenced *Feature Notice IP$^7$ Secure Gateway™ Release* 1.0 publication. With particular regard to the TSM triggered LNP services module mentioned above, a detailed description of the Tekelec triggered LNP solution may be found in the *Feature Guide LNP LSMS* PN/910-1598-01, Rev. A, January 1998, published by Tekelec, the disclosure of which is incorporated herein by reference in its entirety. Furthermore, systems and methods for providing triggerless LNP functionality within a network routing node are described in commonly-assigned, co-pending U.S. patent application Ser. No. 09/503,541 filed Feb. 14, 2000, the disclosure of which is incorporated herein by reference in its entirety.

Figure 3:
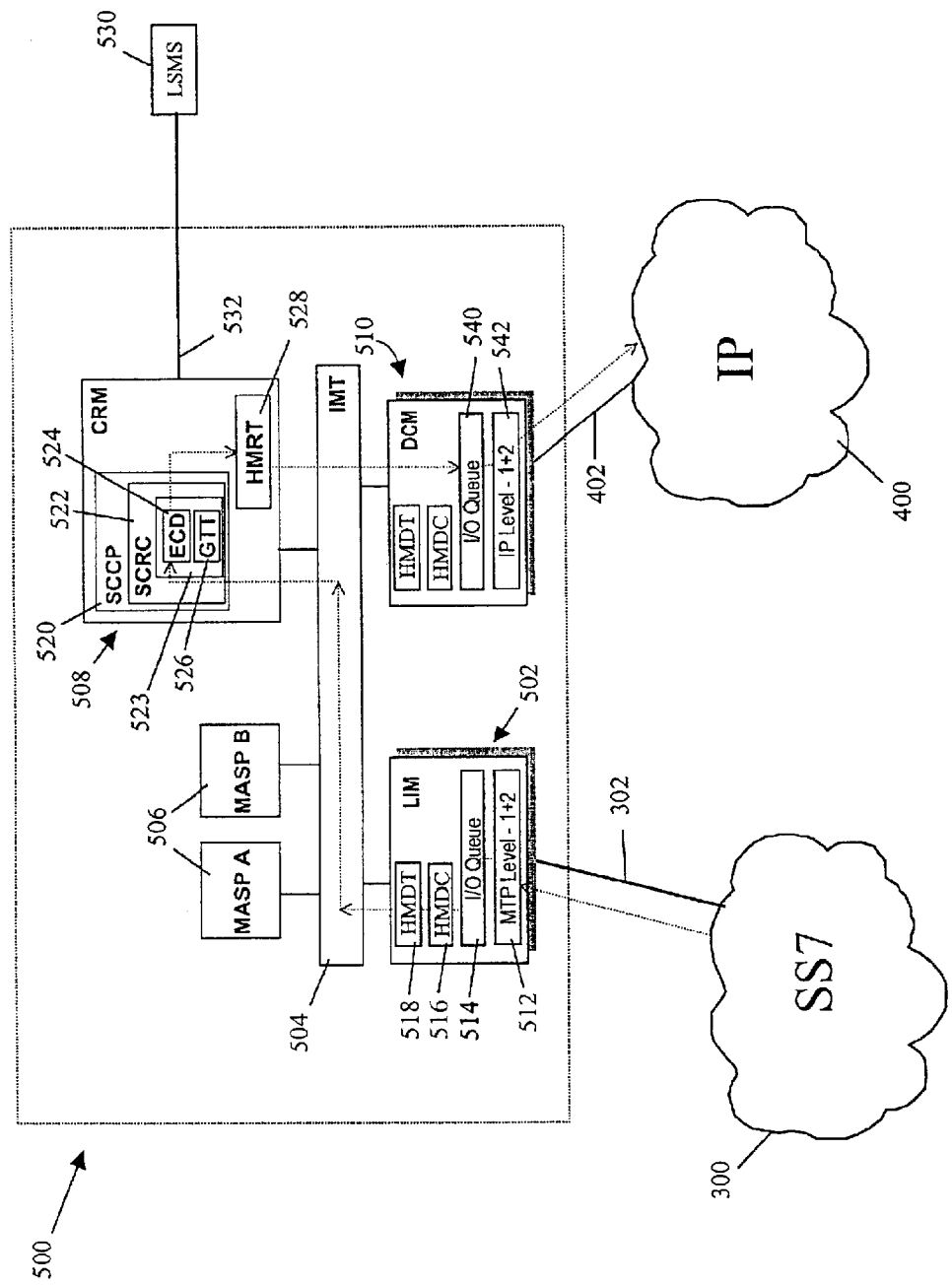
FIG. 3 is a schematic network diagram illustrating a first CNAM routing database access scenario according to a preferred embodiment of a CNAM routing node of the present invention.

Shown in FIG. 3 is one embodiment of a CNAM routing node of the present invention, generally indicated by the numeral 500. It will be appreciated that CNAM routing node 500 includes a high speed Interprocessor Message Transport (IMT) communications bus 504. Communicatively coupled to IMT bus 504 are a number of distributed processing modules or cards including: a pair of Maintenance and Administration Subsystem Processors (MASPs) 506, an SS7 capable Link Interface Module (LIM) 502, a Database Communication Module (DCM) 510, and a CNAM Routing Module (CRM) 508. These modules are physically connected to the IMT bus 504 such that signaling and other type messages may be routed internally between all active cards or modules. For simplicity of illustration, only a single LIM 502, DCM 510 and CRM 508 are included in FIG. 3. However, it should be appreciated that the distributed, multi-processor architecture of the CNAM routing node 500 facilitates the deployment of multiple LIM, DCM, CRM, and other cards, all of which could be simultaneously connected to the IMT bus 504.

MASP pair 504 implement the maintenance and administration subsystem functions described above. As the MASP pair 504 are not particularly relevant to a discussion of the CNAM routing attributes of the present invention, a detailed discussion of their function is not provided herein. For a comprehensive discussion of additional MASP operations and functionality, the above-referenced Tekelec publications can be consulted.

Focusing now on LIM card functionality, it will be appreciated that LIM 502 is comprised of a number of sub-component processes including, but not limited to: an SS7 MTP level 1 & 2 process 512, an I/O buffer or queue 514, an SS7 MTP level 3 layer HMDC process 516, and an HMDT process 518. MTP level 1 & 2 process 512 provides the facilities necessary to send and receive digital data over a particular physical media/physical interface, as well as to provide error detection/correction and sequenced delivery of all SS7 message packets. 110 queue 514 provides for temporary buffering of incoming and outgoing signaling message packets. MTP level 3 HMDC process 516 receives signaling messages from the lower processing layers and performs a discrimination function, effectively determining whether an incoming SS7 message packet requires internal processing or is simply to be through switched. The HMDT process 518 handles the internal routing of SS7 message packets that require additional processing prior to final routing. Once again, it should be appreciated that a LIM card may contain more functional processes than those described above. The above discussion is limited to LIM functionality associated with the basic processing of in-bound signaling messages.

As such, it will be appreciated that the three functional processes associated with DCM 510 shown in FIG. 3 are simply those processes that are relevant to a discussion of out-bound DCM operation in the examples of CNAM routing node operation disclosed herein. The processes explicitly shown on the out-bound DCM 510 include an I/O queue 540 and IP level 1 & 2 process 542. I/O queue 540 facilitates temporary buffering of incoming and outgoing signaling message packets. IP level 1 & 2 process 542 provides the facilities necessary to send and receive IP encapsulated SS7 digital data packets over a particular physical media/physical interface, as well as to provide error detection/correction and sequenced delivery of all IP encapsulated SS7 message packets.

In general, a CRM card 508 includes the database and database control processes necessary to achieve the CNAM routing functionality of the present invention. The CRM 508 shown in FIG. 3 is comprised, in part, of an SCCP process 520, a subsystem controller known as a Signaling Connection Routing Controller (SCRC) process 522, a CNAM routing translation system 523, an Exceptions-based CNAM routing database (ECD) 524, and a default range-based CNAM Global Title Translation database (GTT) 526. It will be appreciated that CNAM routing translation system 523 is discussed herein as including both an ECD database process and a range-based CNAM GTT process. However, such an internal routing translation system configuration is simply one of many possible system implementations. For instance, CNAM routing translation system could be structured to include only a single database process, or conversely could be structured so as to be comprised of more than two database processes. In any event, the particular CNAM routing translation system that is implemented is critical to the operation of the CNAM routing node of the present invention that is discussed and described herein.

SCCP process 520 provides the facilities necessary to receive incoming SCCP-type message packets from the in-bound LIM 502. The SCRC process 522 is responsible for discrimination of signaling messages at the SCCP level, and for the directing of incoming SS7 message packets to the CNAM routing translation system 523, which subsequently directs the packet to either the ECD database process 524 or the CNAM Global Title Translation (GTT) database process 526. CNAM CNAM routing translation system 523 is also responsible for modification of the message packets to include routing information returned by the ECD or CNAM GTT database processes 524 and 526, respectively. SS7 message packets leaving CNAM routing translation system 523 are received and further processed by an HMRT process 528. The HMRT process 528 is responsible for the external routing of SS7 message packets that do not require additional processing by the CNAM routing node 500. That is, the HMRT process 528 determines to which LIM or DCM card an SS7 message packet should be routed for subsequent outbound transmission.

As generally indicated in FIG. 3, CRM SOS is in communication with and serviced by a Local Service Management System (LSMS) 530. In general, an LSMS system is also in communication with a Number Portability Administration Center (NPAC). As such, an LSMS acts as the interface between carrier networks and the NPAC. In a typical implementation, an LSMS receives and stores ported subscriber information from the NPAC and then, in turn, is responsible for downloading this ported subscriber information to all subscribers which it services. As the interaction between an NPAC and an LSMS is not particularly relevant to the present invention, a detailed discussion of such NPAC-LSMS system functionality will not be presented herein. It should suffice to state that the LSMS 530 maintains the CNAM routing translation system 523 with the most current ported subscriber information available at any given time. That is, the LSMS 530 provides the carrier that owns CNAM routing node 500 with updated information regarding the carrier's current customer base. As such, CNAM routing translation system 523 provides the carrier with the information necessary to determine whether an incoming CNAM query is associated with a customer serviced by the carrier or whether the customer is being serviced by a competing carrier.

It should be appreciated that outgoing SS7 message packets routed through the DCM 510 will be transmitted out of the CNAM routing node 500 and into an Internet Protocol (IP) network 400. As the SS7 communication protocol and the IP communication protocol are not inherently compatible, all SS7 message packets that are to be sent into the IP network 400 are first encapsulated within an IP routing envelope prior to transmission. This IP encapsulation is performed by the IP Level 1 & 2 process 542. The IP encapsulation processing is the IP protocol equivalent of the processing performed by SS7 MTP level 1–2 layer process 512 of the LIM module 502. Preferred packet formats for encapsulating various types of SS7 messages in IP packets is described in Internet Engineering Task Force (IETF) INTERNET DRAFT entitled Transport Adapter Layer Interface, May 28, 1999, the disclosure of which is incorporated herein by reference in its entirety.

Once again, the description of LIM and DCM subcomponents provided herein is limited to those subcomponents that are relevant to the sample implementation scenarios illustrated and discussed herein. For a comprehensive discussion of additional LIM and DCM operations and functionality, the above-referenced Tekelec publications can be consulted.

As stated above, one problem associated with CNAM information acquisition by a carrier involves the porting of subscribers in to and out of the carrier's network. Consequently knowledge of which customers are owned by the carrier becomes an issue when CNAM must be obtained. As such, it will be appreciated that one of the primary objectives of the CNAM routing node according to an embodiment of the present invention is to provide a method by which a network operator can quickly and easily direct CNAM query messages associated with a given calling party to a specific CNAM database. More particularly, it is an object of the present invention to provide a carrier with a method of directing all CNAM queries associated with customers that are serviced by the carrier to a local CNAM database that is owned by the carrier. At the same time, it is an object of the present invention to provide a carrier with a method of directing all CNAM queries associated with customers that are not serviced by the carrier to a national CNAM database that is not necessarily owned by the carrier. To facilitate such CNAM query message routing, the CNAM routing node of the present invention employs a pair of complimenting routing databases which effectively map a calling party telephone number associated with a CNAM query to the network address of the appropriate CNAM database node. These databases, described above, are referred to as the Exceptions-based CNAM routing Database (ECD), and the CNAM GTT database.

FIGS. 4a and 4b are database structure diagrams which are intended primarily to illustrate the key or indexing structures of the ECD and CNAM GTT databases 524 and 526, respectively. It should be appreciated that the ECD and CNAM GTT database record structures and pseudo data presented in FIGS. 4a and 4b, while supportive of the examples shown in FIG. 3, are merely illustrative of the basic information necessary to perform the required CNAM routing data lookups. In practice, the actual database record structures and overall database design may vary according to particular implementation requirements.

The complimentary database access scheme employed by the CNAM routing node of the present invention requires that the CNAM GTT database 526 maintain a set of range or block-based routing rules while the ECD database 524 contains exceptions to the block-based routing rules. Once again, this concept is generally illustrated in FIGS. 4a and 4b. By range or block-based routing rules, it is meant that a block or range of telephone numbers are associated with the network address of a particular CNAM SCP.

Referring to FIG. 4b, the CNAM GTT or range-based CNAM database 526 includes key fields in the left hand column and data fields in the right hand column. The key fields represent ranges of telephone numbers associated with a particular CNAM database node. For example, the first key field specifies a minimum telephone number of 9194600000 and a maximum telephone number of 9194609999. The data fields corresponding to this range include a Point Code (PC) of 2-1-1, a Subsystem Number (SSN) of 20, and a Routing Indicator (RI) value indicative of RT-ON-SSN for the CNAM SCP network element corresponding to the first range in the key field. The data included in the data fields are merely illustrative of data fields that can be included in range-based CNAM GTT database 526. Similar key fields and data fields are shown for other network elements.

Referring to FIG. 4a, the ECD or exceptions-based CNAM database 524 contains entries that are exceptions to the entries in the range-based database 526. In FIG. 4a, the left-hand column includes key values for each entry, and the right hand column includes data fields for each entry. The first entry includes a key field value of 9194605500. The data fields corresponding to the first key field value include an Internet Protocol (IP) host name of 1.1.25.12 and port value of 34. These data fields are merely illustrative of the data fields that can be included in the exception-based or ECD database 524. The remaining entries in the database 524 contain similar data for other network elements.

The dual database architecture employed in one embodiment of the CNAM routing translation system 523 of the CNAM routing node of the present invention provides a number of subtle benefits to the network operator. For example, the complimenting nature of the two databases optimally minimizes routing database memory resource requirements. Furthermore, the task of maintaining and administering the CNAM routing node is greatly simplified, in that only exceptions to the conventional block-based routing rules must be explicitly entered in the ECD database. If such were not the case and, for example, a particular carrier serviced 500,000 customers, then that carrier would be required to create and store at least one unique routing record for each of the 500,000 customers. The exceptions-based structure of the CNAM routing translation system 523 simply requires, in such a case, that the carrier create and store individual routing records in the ECD database only for those customer telephone numbers that do not adhere to the range or block-based rules that have been specified in the CNAM GTT database. For example, if a new customer is ported in to a carrier's network from a competitor's network, the customer's telephone number may be an exception to the block based rules provisioned In the CNAM GTT database. In such a case, the new customer's telephone number would be provisioned in the ECD. In the special case where all of a carrier's customer telephone numbers adhere to the block-based rules specified in the CNAM GTT database, the ECD database would be empty. At the other extreme, where all of a carrier's customer telephone numbers do not adhere to the general block-based rules specified in the CNAM GTT database, the ECD database would contain at least one entry for each of the carrier's assigned telephone numbers.

With regard to routing node translation services, the parameter generally used either directly or indirectly to determine the type of translation service (e.g., CNAM service or other translation services) required by an incoming signaling message is an SCCP layer parameter, Translation Type (TT). It will be appreciated that other parameters included within a CNAM query message such as, a Routing Indicator (RI), a Global Title Indicator (GTI) parameter, a Numbering Plan (NP) parameter, and a Nature of Address Indicator (NAI) parameter may also be used to determine whether CNAM routing service is indicated. These parameters, their meanings within the context of an SS7 communication network, and their range of values are well known to those skilled in the art and consequently will not be discussed in detail. It should suffice to say that the preferred embodiment of the CNAM routing node of the present invention relies on some or all of these parameters to determine the required translation service.

From an operational standpoint, signaling messages requiring routing database processing are first serviced by the exception-based ECD database. That is, a lookup is performed in the ECD database based on the telephone number associated with the calling party. In the event that a match is located in the ECD database, the appropriate routing data is returned by the ECD database and the query signaling message packet is modified accordingly before further routing. No secondary search of the block-based CNAM GTT database is required in such a case. However, in the event that no match is located in the ECD database, a secondary search is performed in the range-based CNAM GTT database.

EXCEPTION-BASED CNAM DATABASE TRANSLATION PROCESS

Figure 6:
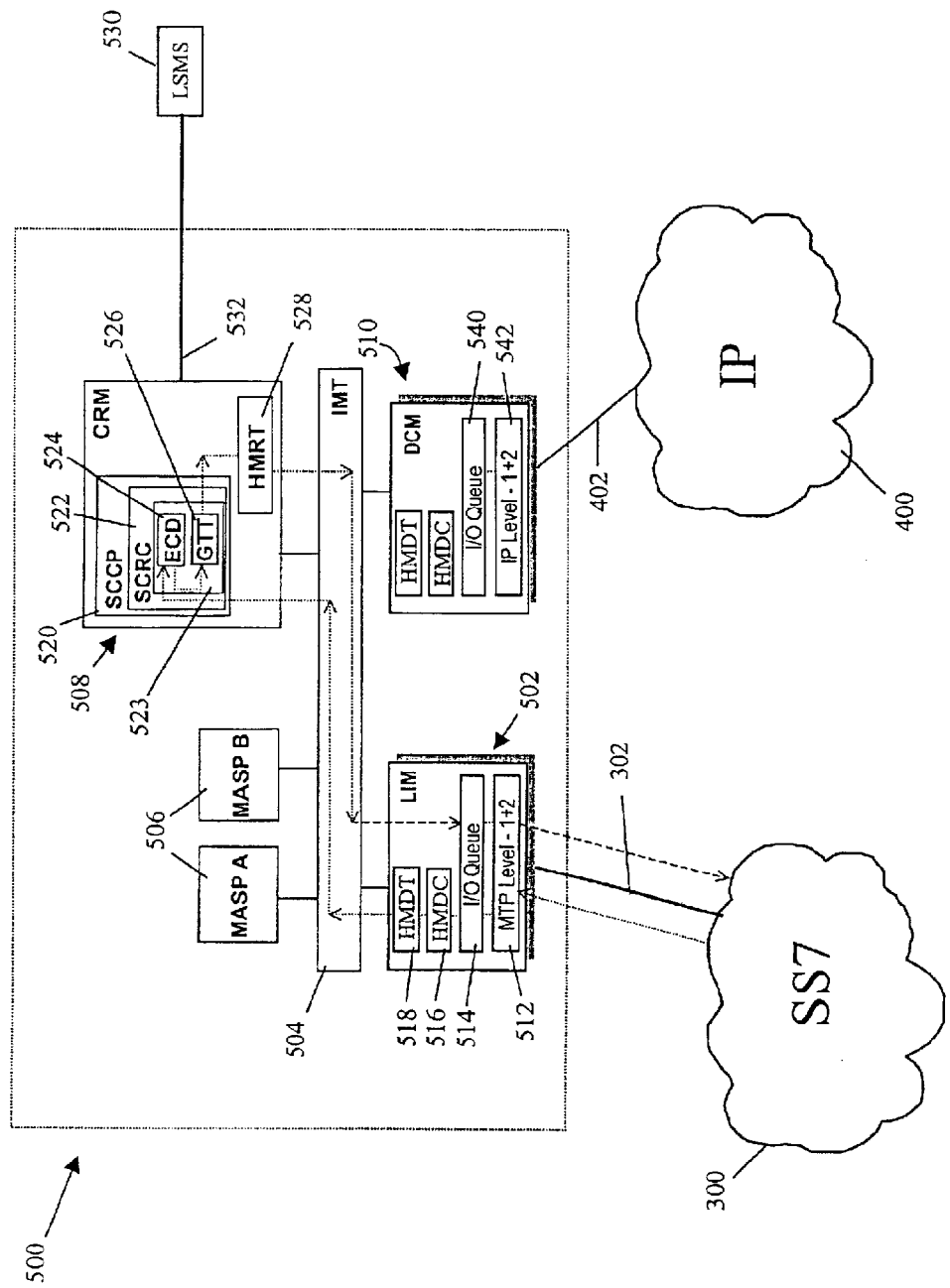
FIG. 6 is a schematic network diagram illustrating a second CNAM routing database access scenario according to a preferred embodiment of a CNAM routing node of the present invention.

FIGS. 3 and 6 generally illustrate the two routing database access scenarios briefly described above. More particularly, FIG. 3 diagrams the case where the initial ECD database lookup finds a match and hence no secondary CNAM GTT database search is required. To illustrate this case, the path of a typical SS7 CNAM query message is traced from an SS7 network 300, through the CNAM routing node 500 and in to an associated Internet Protocol (IP) network 400, with the path being indicated by a dashed line.

Beginning at the SS7 network 300, a CNAM query message arrives at the CNAM routing node 500 via an SS7 communication link 302. It will be appreciated that in a preferred embodiment, all incoming CNAM query messages are addressed to either a true point code or capability point code of the CNAM routing node. While such a CNAM query message addressing scheme offers distinct provisioning advantages for the carrier operating the CNAM routing node, it is not essential for operation of the node.

The signaling message is received within the CNAM routing node 500 by LIM 502. SS7 MTP Level 1 and 2 processing is performed on the incoming signaling message packet by the MTP Level 1 and 2 process 512. With MTP Level 1 and 2 processing complete, the signaling message packet is temporarily buffered in the I/O queue 514 before being passed up the stack to the MTP Level 3 HMDC process 516. The HMDC process 516 examines the signaling message packet and determines whether the packet requires further processing at the CNAM routing node 500. In the example shown in FIG. 3, it is assumed that the HMDC process 516 determines that further processing of the signaling message packet is required, and the packet is subsequently passed to the HMDT process 518. The HMDT process 518 examines the packet and determines, based on the type of further processing that is required, which distributed processing module connected to the IMT bus 504 should next receive the packet. In this case, the HMDT process 518 determines that the signaling message should be forwarded to CRM module 508 for ECD translation service. The signaling message packet is then placed on the high speed IMT bus 504 and sent to CRM 508.

Figure 5:
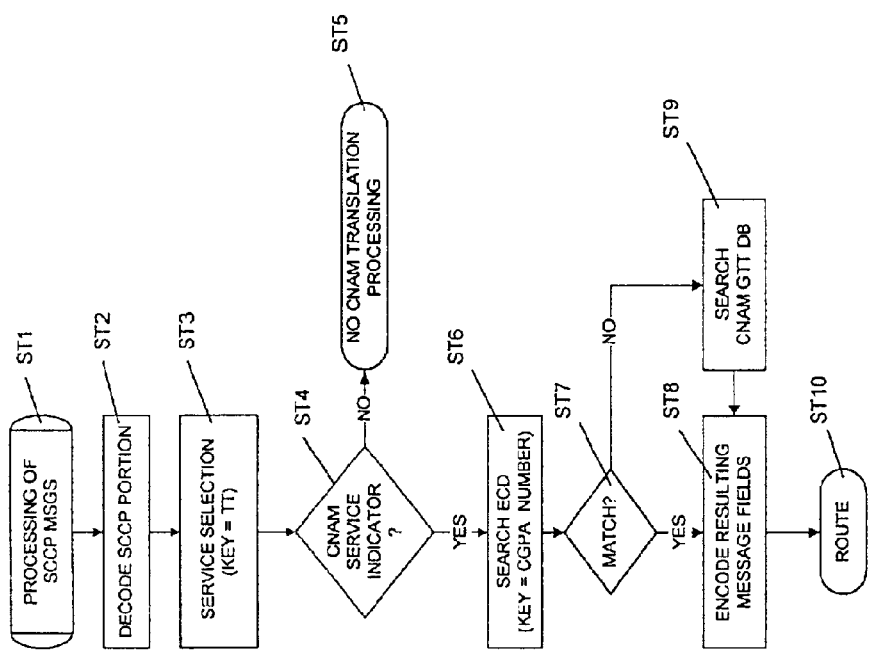
FIG. 5 is a flow chart diagram illustrating message routing processing of a CNAM query message according to an embodiment of a CNAM routing node of the present invention.

A detailed flow chart of CRM/SCCP related processing steps is presented in FIG. 5, and may be used in conjunction with the schematic diagram shown in FIG. 3 and the sample CNAM Exception and CNAM GTT databases shown in FIGS. 4a and 4b, respectively, to better understand the ECD and CNAM GTT database lookup methodology.

In the example presented in FIG. 3 and procedurally described in FIG. 5, it is assumed that a CNAM query has been formulated and launched by an SSP with regard to a call setup operation involving a calling party (CgPA) with a telephone number of (919) 460-5500.

Referring to FIG. 5, in step ST1, the signaling message arrives at the CRM card 508 and SCCP process 520 receives the packet. Within SCCP process 520, the message packet is passed to the SCRC controller process 522. In steps ST2 and ST3, respectively, the SCRC process 522 decodes and examines packet content information contained within the signaling message header in order to establish which type of translation service is required. More particularly, the Translation Type (TT) parameter contained within the signaling message packet is analyzed to determine whether CNAM translation service is required. As indicated in steps ST4 and ST5, respectively, if it is determined that non-CNAM translation service is required, no further CNAM routing translation processing is performed. Instead, the message may be processed by other provisioned systems within the CNAM routing node of the present invention, and subsequently routed from the node 500. However, in the scenario presented in FIG. 3, the Translation Type (TT) parameter contained within the query message is interpreted as indicating the need for a CNAM translation.

In step ST6, the message is passed generally into the CNAM routing translation system 523 and subsequently on to ECD database 524 where a search is performed using the telephone number associated with the calling party (i.e., 9194605500) as at least a portion of the search key. If a match is not found in the ECD database 524, the packet is passed to the CNAM GTT database 526 for processing, as shown in steps ST7 and ST9, respectively. However, in the example presented in FIG. 3, a match is found in the ECD database 524, as indicated by the fact that there is an entry in the ECD database 524 (FIG. 4a) corresponding to the message's CgPA telephone number value of 9194605500. It will be appreciated from FIG. 4b that the range or block-based CNAM routing rules contained in CNAM GTT database 526, indicate that all telephone numbers within the range 9194600000 to 9194609999 would ordinarily be serviced or owned by the carrier, and as such all CNAM queries associated with a CgPA telephone number with this range would be routed to a local CNAM database owned by the carrier. More particularly, all telephone numbers within this range would be routed to a carrier owned, local CNAM database that is identified by an SS7 point code (PC) of 2-1-1 and a Subsystem Number (SSN) of 20. However, as the CgPA telephone number 9194605500 has been provisioned in the ECD database 524, it is implied that the calling party has been ported out of the carrier's network and is currently being service by one of the carrier's competitors. As such, it will be further appreciated that the CNAM query message routing instructions associated with the 9194605500 entry in the ECD database 524 indicate that CNAM query message should be routed to a national CNAM database that has a destination Internet Protocol address corresponding to a Host name of 1.1.25.12 and a Port of 34.

Returning to FIG. 5, the IP routing address data returned by the ECD database process 524, a Host name of 1.1.25.12 and Port of 34, is subsequently encoded within the signaling message packet, as indicated by step ST8. Once again, it will be appreciated that the routing information, Host name: 1.1.25.12 and Port: 34, returned by the ECD database 524 effectively constitutes the IP network address of a national CNAM database. Where, a national CNAM database is a database system comprised of one or more database applications and computing platforms that are configured to include CNAM-type information for substantially all telecommunication customers in a country. It will be appreciated, however, that such a national CNAM database could be configured to include CNAM data for substantially all telecommunications customers from more than one country.

Returning now to FIG. 3, it will be appreciated that following the successful ECD database lookup as described in detail above, the modified signaling message packet is next passed to the HMRT process 528. Once again, the HMRT process 528 determines to which LIM or DCM card the packet should be routed for subsequent transmission to the destination CNAM database node. In this case, the HMRT process 528 determines that the link connecting the CNAM routing node 500 and the destination CNAM database node is located on DCM 510. Consequently, the modified CNAM query message packet is internally routed across the IMT bus 504 to DCM 510 and, more particularly, to the I/I queue 540. Eventually, the modified message packet is passed from the I/O queue 540 and on to IP Level 1 & 2 process 542, where the SS7 packet is encapsulated within an IP routing envelope. The IP encapsulated SS7 packet is then transmitted into the associated IP network 400 via the IP signaling link 402 (Step ST10 in FIG. 5). In this example, the IP encapsulated SS7 packet is addressed and consequently routed through the IP network 400 to the final destination, a national CNAM database which can be owned by the service provider or owned and operated by an independent third party.

DEFAULT CNAM GTT TRANSLATION

Turning now to FIG. 6, the example message flow scenario presented in this diagram illustrates the case where an initial ECD database lookup fails to find a match and hence a secondary or default CNAM GTT database search is required. The path of a typical CNAM database SS7 query message is traced from the SS7 network 300, through the CNAM routing node 500 and in to the destination IP network 400. Once again, the signaling message pathway is indicated by a dashed line. In the example presented in FIG. 6 and procedurally described in FIG. 5, it is assumed that a CNAM query has been formulated and launched by an SSP with regard to a call setup operation involving a calling party (CgPA) with a telephone number of (919) 4602000.

Beginning at the SS7 network 300, a CNAM query message arrives at the CNAM routing node 500 via an SS7 communication link 302. Once again, it will be appreciated that in a preferred embodiment, all incoming CNAM query messages are addressed to either a true point code or capability point code of the CNAM routing node. While such a CNAM query message addressing scheme offers distinct provisioning advantages for the carrier operating the CNAM routing node, it is not essential for operation of the node.

As processing of the incoming signaling message packet on the LIM 502 in this scenario is identical to that described for the scenario illustrated in FIG. 3 and described above, a detailed discussion of LIM processing will not be repeated. Instead, it will be appreciated that the incoming signaling message is received within the CNAM routing node 500 by LIM 502 and that the message packet is subsequently examined and routed via IMT bus 504 to CRM card 508 for further processing.

Again, the detailed flow chart of CRM/SCCP related processing steps presented in FIG. 5 can be used in conjunction with the schematic diagram shown in FIG. 6 to better understand the ECD and GTT database lookup methodology. Referring to FIGS. 5 and 6, in step ST1, the signaling message arrives at the CRM card 508 and SCCP process 520 receives the packet. Within SCCP process 520, the message packet is passed to the SCRC controller process 522. In steps ST2 and ST3, respectively, the SCRC process 522 decodes and examines packet content information contained within the signaling message header in order to establish which type of translation service is required. More particularly, the Translation Type (TT) parameter contained within the signaling message packet is analyzed to determine whether a CNAM or a non-CNAM GTT translation service is required (ST4). Once again, as in the preceding example, a TT value contained in the message is interpreted as indicating the need for a CNAM routing translation.

In step ST6, the message is passed into the CNAM routing translation system 523 and subsequently on to the ECD database 524, where a search is performed using the telephone number associated with the calling party (i.e., 9194602000) as at least a portion of the search key. If a match is not found in the ECD database 524, the packet is passed to the CNAM GTT database 526 for default routing address translation processing, as shown in steps ST7 and ST9, respectively. Such is precisely the case in the example presented in FIG. 6, as a match is not found in the ECD database 524. That is, there is not an entry in the ECD database 524 (FIG. 4a) corresponding to the message's CgPA telephone number value of 9194602000. It will be appreciated from FIG. 4b that the range or block-based CNAM routing rules contained in CNAM GTT database 526, indicate that all telephone numbers within the range 9194600000 to 9194609999 would ordinarily be serviced or owned by the carrier, and as such all CNAM queries associated with a CgPA telephone number with this range would be routed to a local CNAM database owned by the carrier. More particularly, all telephone numbers within this range would be routed to a carrier owned, local CNAM database that is identified by an SS7 point code (PC) of 2-1-1 and a Subsystem Number (SSN) of 20. As the CgPA telephone number 91946020000 has not been provisioned in the ECD database 524, it is implied that the calling party is owned or serviced by the carrier and not one of the carrier's competitors. As such, it will be further appreciated that since the CgPA telephone number (9194602000) falls within a range of provisioned telephone numbers stored in the CNAM GTT database 526, the CNAM query message should be routed to a local, carrier owned, CNAM database that has a destination SS7 address corresponding to a point code (PC) of 2-1-1 and a Subsystem (SSN) of 20. The SS7 routing address data returned by the CNAM GTT database process 526, a PC of 2-1-1, a SSN of 20, and a Routing Indicator of RT-ON-SSN are subsequently encoded within the signaling message packet, as indicated by step ST8. Once again, it will be appreciated that the routing information, PC: 2-1-1 and SSN: 20, returned by the CNAM GTT database 526 effectively constitutes the SS7 network address of a local CNAM database. Where, a local CNAM database is a database system comprised of one or more database applications and computing platforms that are configured to include CNAM-type information for substantially all telecommunication customers serviced by a particular carrier. It will be appreciated, however, that such a local CNAM database could be configured to include CNAM data for substantially all telecommunications customers associated with multiple carriers.

Returning now to FIG. 6, it will be appreciated that following the failed ECD database lookup and successful CNAM GTT database lookup as described in detail above, the modified signaling message packet is next passed to the HMRT process 528. Once again, the HMRT process 528 determines to which LIM or DCM card the packet should be routed for subsequent transmission to the destination CNAM database node. In this case, the HMRT process 528 determines that the link connecting the CNAM routing node 500 and the destination CNAM database node is located on LIM 502. Consequently, the modified CNAM query message packet is internally routed across the IMT bus 504 to LIM 502 and, more particularly, to the I/O queue 514. Eventually, the modified message packet is passed from the I/O queue 514 and on to MTP Level 1 & 2 process 512, where the SS7 packet is then transmitted into the associated SS7 network 400 via the SS7 signaling link 302. In this example, the SS7 CNAM query packet is addressed and consequently routed through the SS7 network 300 to a final destination, more specifically, a local CNAM database (ST10) co-located and/or owned by the service provider.

SAMPLE CNAM ACCESS CONFIGURATIONS AND ASSOCIATED MESSAGE FLOWS

Figure 7:
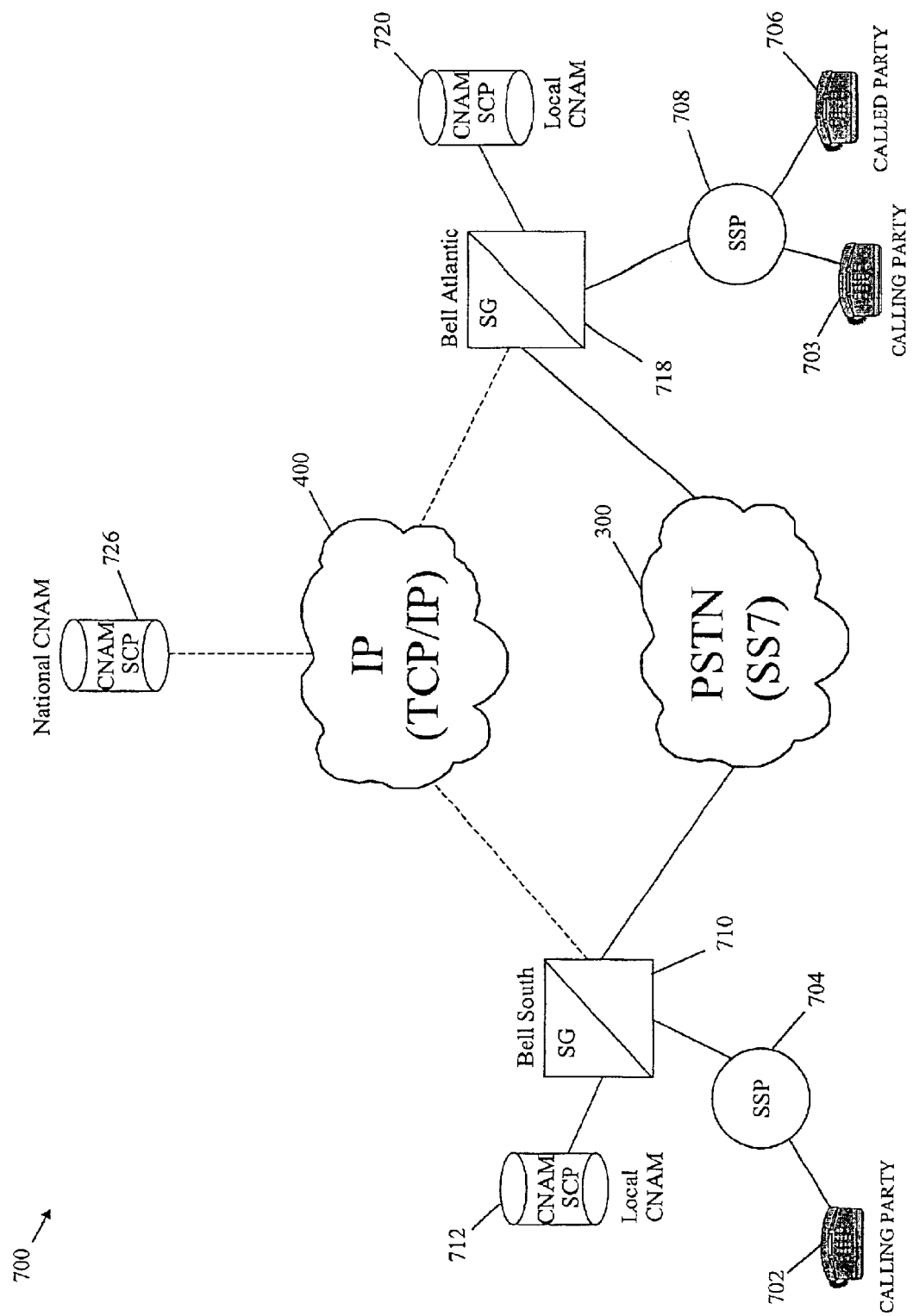
FIG. 7 is a schematic network diagram illustrating a network implementation of a CNAM routing node of the present invention that provides access to both a local and a national CNAM database.
Figure 8:
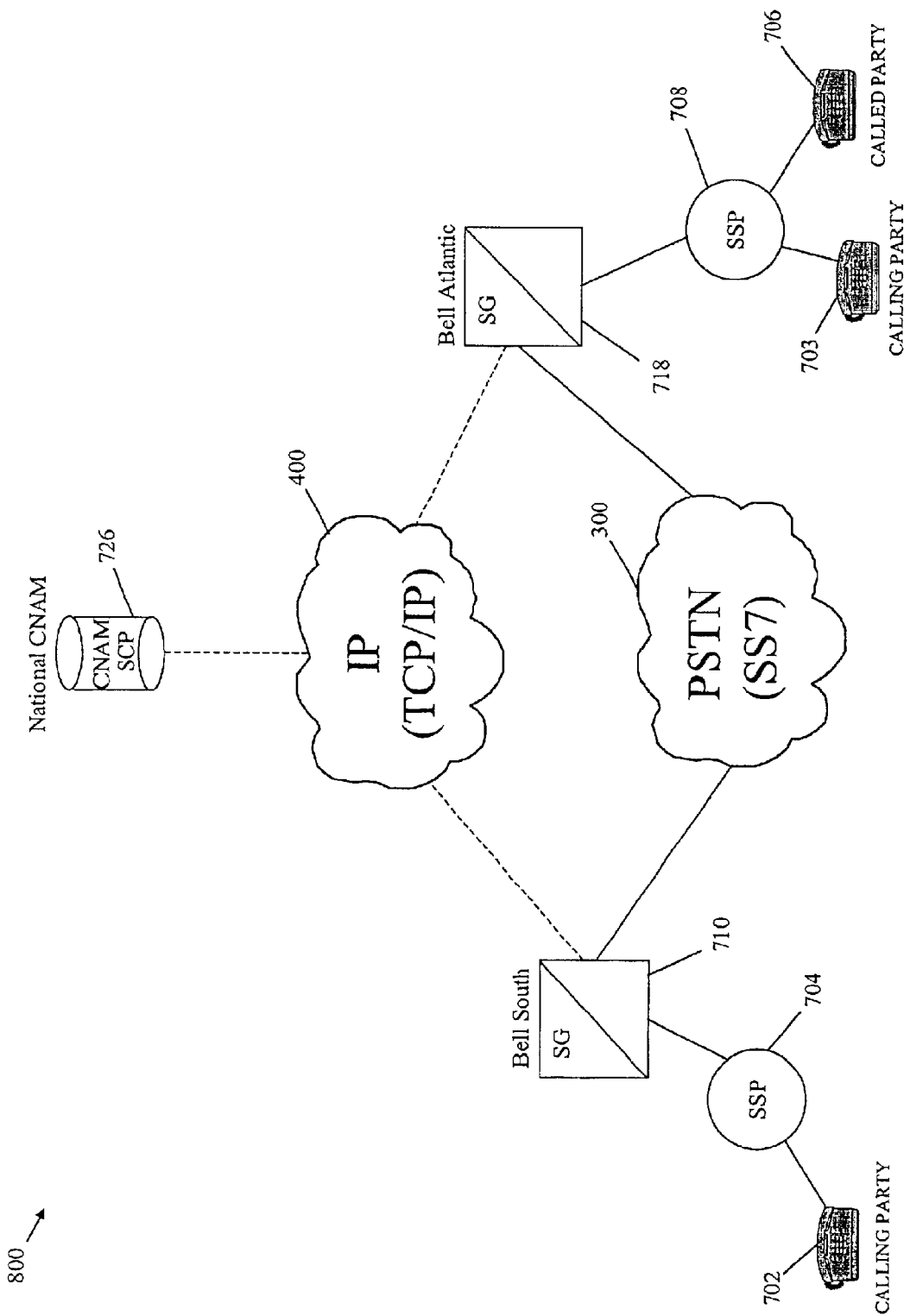
FIG. 8 is a schematic network diagram illustrating an alternate network implementation of a CNAM routing node of the present invention that provides access to a national CNAM database.

Shown in FIGS. 7 and 8 are simplified network diagrams that generally illustrate two possible network configurations which could be employed with a CNAM routing node of the present invention to provide CNAM delivery service to carrier customers.

More particularly, presented in FIG. 7 is a telecommunications network CNAM service configuration that allows carriers to access a local CNAM database in the course of providing CNAM service associated with calling parties that are, in fact, their own customers. In the event that CNAM service is required for a calling party that is not serviced by the carrier, all associated CNAM queries are directed to a national CNAM database via an Internet Protocol network.

As such, FIG. 7 includes a telecommunication network, generally indicated by the numeral 700. Explicitly shown in Network 700 is a calling party (CgPA) 702 that is serviced by a Service Switching Point (SSP) 704, a CgPA 703 that is serviced by SSP 708, and a called party (CdPA) 706 that is similarly serviced by an SSP 708. Network 700 further includes a number of Signaling Gateways (SGs) which are owned and operated by different service providers. More particularly, network 700 includes SGs 710 and 718 that are owned by Bell South and Bell Atlantic, respectively. Both of these SGs are embodiments of the CNAM routing node of the present invention and are connected either directly or indirectly via Signaling System 7 (SS7) links that collectively comprise the Public Switched Telephone Network (PSTN) SS7 network 300. As further indicated in FIG. 7, SG 710 is locally connected to an SCP node 712 that contains CNAM-type information associated with customers serviced by Bell South. Similarly, SG 718 is locally connected to an SCP node 720 that contains CNAM-type information associated with customers serviced by Bell Atlantic. It will also be appreciated that both SG 710 and SG 718 are connected to a national CNAM database 726 via an Internet Protocol network 400.

In the example illustrated in FIG. 7, it will be appreciated that the calling party 702 is serviced by a carrier (Bell South) other than the carrier (Bell Atlantic) servicing the calling party 703 and called party 706. As such, it will be appreciated that if calling party 702 placed a call to called party 706, the carrier (Bell Atlantic) servicing called party 706 would ordinarily be required to send a CNAM query to the carrier (Bell South) servicing calling party 702, requesting CNAM information. Once again, in such a scenario, the carrier (Bell Atlantic) requesting the CNAM information for calling party 702 would likely be charged a fee for obtaining the required CNAM information.

However, in such a scenario, the configuration generally illustrated in FIG. 7 allows the carrier (Bell Atlantic) servicing the called party 706 to route a CNAM query via CNAM equipped SG 718 and IP network 400 to the national CNAM database 726 to obtain the desired CNAM information associated with calling party 702. While, in practice, the carrier (Bell Atlantic) servicing called party 706 might be charged a fee for the calling party CNAM information by the national CNAM database operator, it is likely that the fee structures offered by the national CNAM operator would be more favorable than those offered by the competing carrier (Bell South).

It will also be appreciated from the network configuration shown in FIG. 7 that, in the event that a call is placed between calling party 703 and called party 706, both of which are serviced by the same carrier (Bell Atlantic), a national CNAM database query is not required. Instead, in such a call scenario, the carrier (Bell Atlantic) servicing both the calling and called parties 703 and 706, respectively, simply directs the necessary CNAM query via the CNAM equipped SG 718 to a local CNAM database 720 that contains information related to all of the carrier's customers. As such, in this scenario, the carrier (Bell Atlantic) is able to completely avoid any third-party fees associated with obtaining CNAM information.

Alternatively, carriers may choose not to maintain their own local CNAM databases, as generally indicated in FIG. 8. As such, FIG. 8 includes a telecommunication network, generally indicated by the numeral 800. Explicitly shown in Network 800 is a calling party (CgPA) 702 that is serviced by a Service Switching Point (SSP) 704, a CgPA 703 that is serviced by SSP 708, and a called party (CdPA) 706 that is similarly serviced by an SSP 708. Network 800 further includes a number of Signaling Gateways (SGs) which are owned and operated by different service providers. More particularly, network 700 includes SGs 710 and 718 that are owned by Bell South and Bell Atlantic, respectively. Both of these SGs are embodiments of the CNAM routing node of the present invention and are connected either directly or indirectly via Signaling System 7 (SS7) links that collectively comprise the Public Switched Telephone Network (PSTN) SS7 network 300. As further indicated in FIG. 8, both SG 710 and SG 718 are also connected to a national CNAM database 726 via an Internet Protocol network 400.

In such a scenario, all CNAM queries, regardless of the carrier that services a calling party, are routed by the CNAM equipped SGs 710 and 718 to the national CNAM database 726 via the IP network 400. For instance, in such a network configuration, it will be appreciated that, in the event that a call is placed between calling party 703 and called party 706, both of which are serviced by the same carrier (Bell Atlantic), the resulting CNAM query message received by SG 718 is simply routed to the national CNAM database 716.

Figure 9:
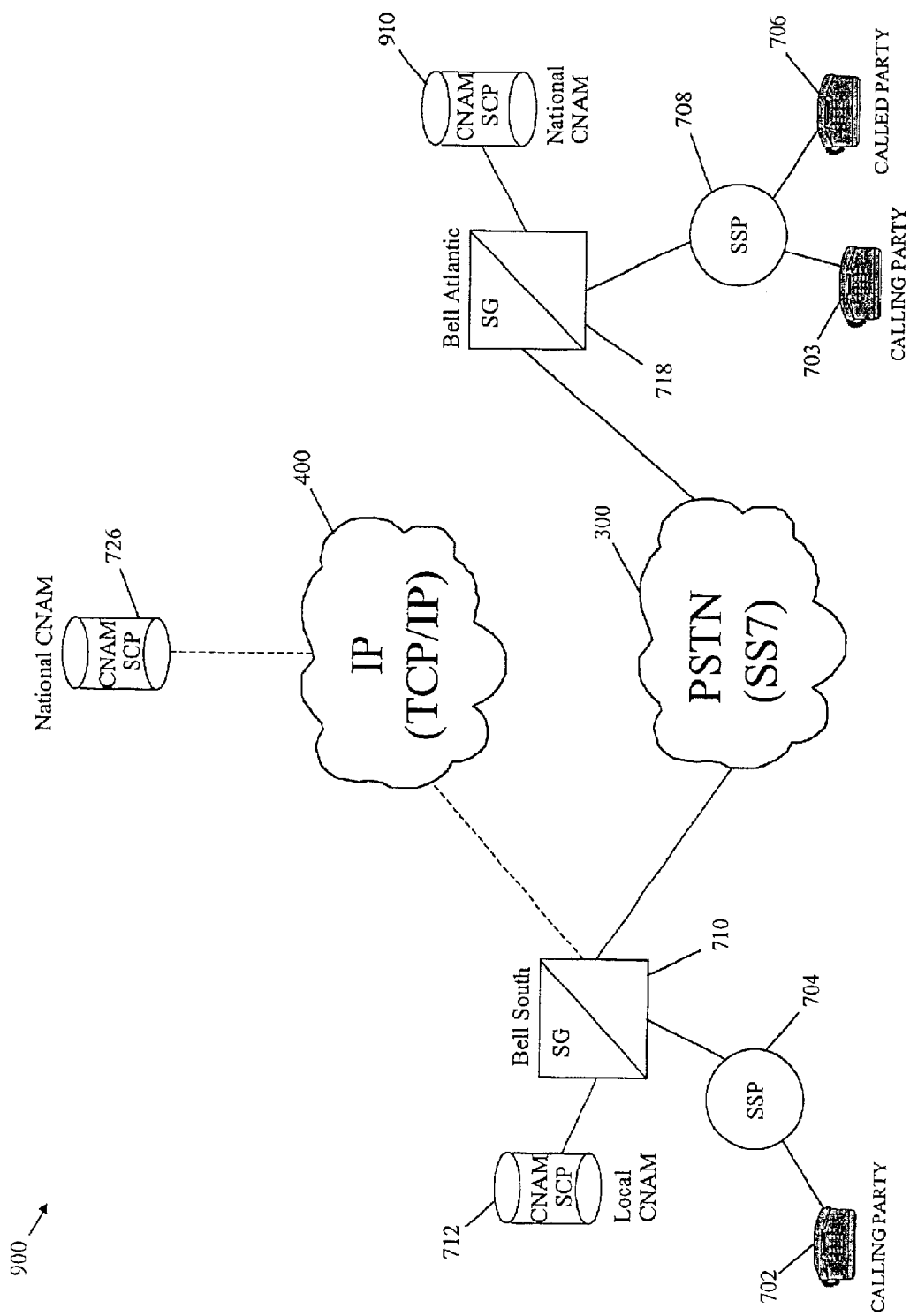
FIG. 9 is a network diagram illustrating a network including a national CNAM database coupled to a CNAM routing node, wherein the national CNAM database and the routing node are owned by the same service provider.

It will also be appreciated that a carrier may choose to maintain their own copy of a national CNAM database instead of relying on a remotely located national CNAM database owned and operated by a third party. Such an example network configuration is generally indicated in FIG. 9. As such, FIG. 9 includes a telecommunication network, generally indicated by the numeral 900. Explicitly shown in Network 900 is a calling party (CgPA) 702 that is serviced by a Service Switching Point (SSP) 704, a CgPA 703 that is serviced by SSP 708, and a called party (CdPA) 706 that is similarly serviced by an SSP 708. Network 900 further includes a number of Signaling Gateways (SGs) which are owned and operated by different service providers. More particularly, network 900 includes SGs 710 and 718 that are owned by Bell South and Bell Atlantic, respectively. Both of these SGs are embodiments of the CNAM routing node of the present invention and are connected either directly or indirectly via Signaling System 7 (SS7) links that collectively comprise the Public Switched Telephone Network (PSTN) SS7 network 300. As further indicated in FIG. 9, SG 710 is connected to a national CNAM database 726 via an Internet Protocol network 400 while SG 718 employs no such connection. Instead SG 718 is connected to a co-located national CNAM database 910, which is owned by and operated by Bell Atlantic, while SG 710 is further connected to a local CNAM database 712 that is owned and operated by Bell South.

In such a scenario, all CNAM queries received by SG 718, regardless of the carrier that services a calling party, are routed by the CNAM equipped SG 718 to the national CNAM database 910. For instance, in such a network configuration, it will be appreciated that, in the event that a call is placed either from calling party 702 or 703, to called party 706, which may be serviced by the same carrier (Bell Atlantic) or different carriers (Bell South and Bell Atlantic), the resulting CNAM query message received by SG 718 is simply routed to the co-located, Bell Atlantic-owned national CNAM database 910 and consequently, no third party charges are assessed to Bell Atlantic for national CNAM database access.

NATIONAL CNAM DATABASE

According to another embodiment, the present invention includes a national CNAM database. As used herein, a national CNAM database is a CNAM database that contains calling name information for the subscribers of multiple service providers, e.g., all of the service providers in a given country. The calling name information may be indexed by calling party directory numbers. That is, a national CNAM database according to an embodiment of the present invention may be comprised of a plurality of database records. Each record includes a first data field containing a calling party directory number, such as 9195551212. Each record also contains one or more second data fields containing calling name information. Examples of calling name information that may be included in the second data fields is as follows. Very simply put, the calling name database translates the Calling Party's telephone number, to the telephone numbers subscriber (the name associated with that telephone number). For instance, (919) 555-1212, could translate to John Smith.

From a hardware perspective, a calling name database may be stored in a high-speed memory device, such as an SRAM memory device to allow efficient processing of database queries. Storing database entries in a high-speed memory is particularly important in a national CNAM database in light of the number of queries that may be directed to the database. The calling name database may also include front end processing circuitry for processing queries and accessing the database. Such processing circuitry typically includes a general-purpose computer.

From a software perspective, a national calling name database may include a CNAM search engine for searching database records for a record corresponding to a calling party directory number and query processing circuitry for processing TCAP queries and formulating TCAP responses. Because the present embodiment comprises a national CNAM database, a given service provider need only query one database, preferably owned by the service provider, in order to obtain calling name information for a given call. For example, in the embodiment illustrated in FIG. 9, national CNAM database 910 is connected to signaling gateway 718 and both nodes are owned by Bell Atlantic. Thus, when a call from any calling party number within the country is received by SSP 708, a TCAP query is generated to national CNAM database 910. There is no need to query any other CNAM database because CNAM database 910 contains CNAM information for all subscribers in a given country. As a result, in this example, Bell Atlantic, the owner of the database is not required to pay access charges for obtaining CNAM information from another service provider's database.

Figure 10:
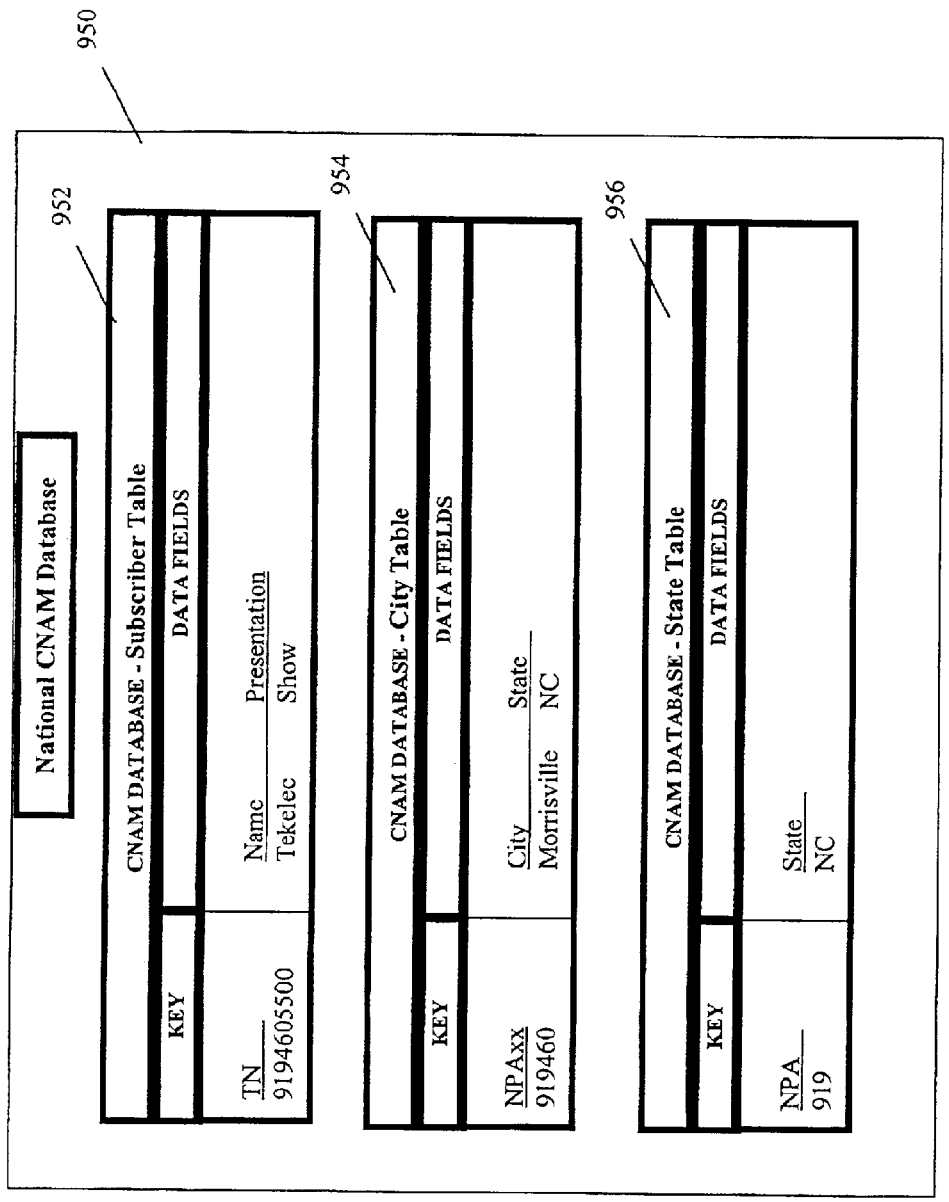
FIG. 10 is a block diagram of a preferred data structure for a national CNAM database according to an embodiment of the present invention.

FIG. 10 is a block diagram of a national CNAM database according to a preferred embodiment of the present invention. In FIG. 10, National CNAM database 950 includes three tables: a subscriber table 952, a city table 954, and a state table 956. Each of the tables 952, 954, and 956 includes a key field and one or more data fields. For example, in subscriber table 952, the key field of each entry includes a calling party directory number. The data fields in table 952 include a calling party name field for storing a calling party name, such as "Tekelec" and a presentation indicator field for storing a presentation indicator value for indicating whether the name is to be displayed the end user. In the illustrated example, the presentation indicator value is "show," indicating that the name in the calling party name field is to be displayed. In an alternative example, the presentation indicator field may contain a value of "hide" to indicate that the calling party name is not to be displayed to the called party. Although only a single example subscriber entry is illustrated, it is understood that subscriber table 952 may include calling name information for all or substantially all of the subscribers in a given country.

Each entry in city table 954 of national CNAM database 950 includes a key field that stores a numbering plan address and a data field that stores a calling party city and state. In the illustrated example, the key field stores a numbering plan address of 919460 and the data field stores a city and state of Morrisville, N.C. City table 954 is accessed when a lookup in subscriber table 952 fails to locate a subscriber corresponding to a calling party directory number. Although only a single entry is illustrated in city table 954, it is understood that city table 954 may include entries for all or substantially all of the cities in a given country.

Each entry in state table 956 of national CNAM database 950 contains a key field that stores a numbering plan address and a data field that stores a state corresponding to the numbering play address. In the illustrated example, the key field stores an NPA value of 919 and the data field stores a state of N.C. State table 956 when lookups in both subscriber table 952 and state table 956 fail to return an entry corresponding to the calling party number. Although only a single entry is illustrated in state table 956, it is understood that state table 956 may include entries for all or substantially all of the states or provinces in a given country.

Figure 11:
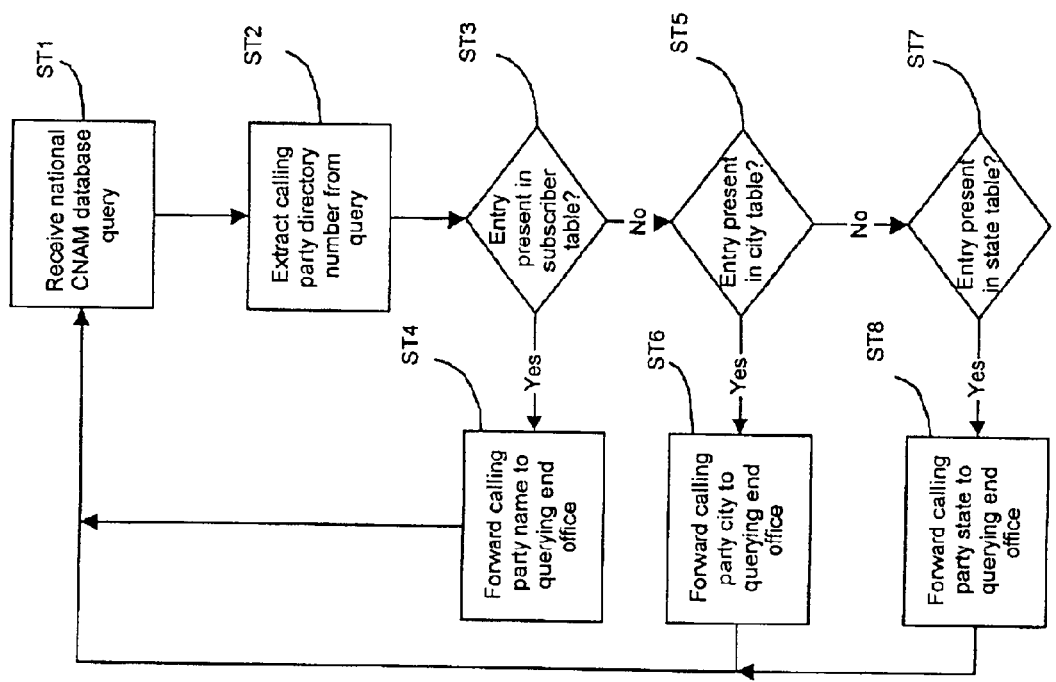
FIG. 11 is a flow chart illustrating exemplary steps that may be performed by a search engine associated with the national CNAM database illustrated in FIG. 10.

FIG. 11 illustrates exemplary steps that may be performed by a search engine operatively associated with national CNAM database 950 illustrated in FIG. 10. In step ST1, the search engine receives a query for calling party name information. For example, the query may originate from a called party end office and be routed through a calling name database routing node according to an embodiment of the present invention. In step ST2, the search engine extracts a calling party directory number from the query.

In step ST3, the search engine searches the subscriber table in the calling name database and determines whether the table contains an entry corresponding to the calling party directory number. In step ST4, if the subscriber table contains a calling party directory number corresponding to the calling party directory number, the search engine extracts the calling name information and sends the information to the querying end office to be displayed to the end user. In this example, it is assumed that the calling name information does not indicate that the calling name information is to be hidden from the end user.

If the search engine fails to locate a record corresponding to the calling party directory number in the subscriber table, in step ST5 the search engine then determines whether an entry corresponding to at least a portion of the directory number is present in the city table. If the search engine locates a corresponding entry in the city table, in step ST6, the search engine returns the calling party city to the querying end office for display to the called party.

If the search engine fails to locate an entry in the city table, the search engine performs a lookup in the state table. Such a lookup may be performed using only the area code from the calling party directory number. In step ST7, the search engine determines whether an entry corresponding to the calling party area code is present in the state table. If such an entry is present, in step ST8, the search engine returns the calling party state to the querying end office for display to the called party. If such an entry is not present, in step ST9, the search engine returns an error message to the querying end office indicating that calling party name information was not found.

Dividing the national CNAM database into three levels enables the search engine to provide calling name information to the end user, even if an entry is not present at one or more levels. Such information may be useful to the end user in screening unwanted calls, identifying incoming long distance calls, and identifying the location of the calling party.

It will be understood that various details of the invention may be changed without departing from the scope of the invention. Furthermore, the foregoing description is for the purpose of illustration only, and not for the purpose of limitation—the invention being defined by the claims.

What is claimed is:

1. A network element for routing a calling name (CNAM) query message through a communications network, wherein the communications network includes a national CNAM database, the network element comprising:
   (a) a communication module capable of receiving a CNAM query message from and transmitting the CNAM query message to a communications network;
   (b) a CNAM query routing information database for storing CNAM query routing information for at least one CNAM database; and
   (c) a CNAM query routing address translation process for performing a lookup in the CNAM query routing information database based on information contained in the CNAM query message and determining whether to route the query message to a national CNAM database based on results from the database lookup.

2. The network element of claim 1 wherein the CNAM query message is a Signaling System 7 (SS7) signaling message.

3. The network element of claim 2 wherein the Signaling System 7 (SS7) signaling message is a Transaction Capabilities Application Part (TCAP) message.

4. The network element of claim 1 wherein the communications network is a Signaling System 7 (SS7) network.

5. The network element of claim 1 wherein the communications network is an Internet Protocol (IP) network.

6. The network element of claim 1 wherein the communication module is a Signaling System 7 (SS7) Link Interface Module (LIM).

7. The network element of claim 1 wherein the communication module is an Internet Protocol (IP) capable Database Communication Module (DCM).

8. The network element of claim 1 wherein the CNAM query message is addressed to a destination point code (DPC) equal to a point code (PC) associated with the network element.

9. The network element of claim 1 wherein the CNAM query routing information includes telephone number information associated with one or more telephone service customers.

10. The network element of claim 1 wherein the CNAM query routing information includes network address information associated with the location of a CNAM database.

11. The network element of claim 1 wherein the information contained within the CNAM query message that is used in the CNAM query routing database lookup is a telephone number associated with a calling party (CgPA).

12. The network element of claim 1 wherein information returned by the CNAM query routing database lookup includes a network address associated with a CNAM database.

13. The network element of claim 12 wherein the CNAM database is a national CNAM database.

14. The network element of claim 12 wherein the CNAM database is a local CNAM database.

15. The network element of claim 12 wherein the network address is an Internet Protocol address.

16. The network element of claim 14 wherein the local CNAM database is owned by a carrier that owns the network element.

17. The network element of claim 14 wherein the local CNAM database contains calling name-type information associated with customers serviced by a carrier that owns the network element.

18. The network element of claim 14 wherein the local CNAM database contains calling name-type information for customers associated with a specific geographic sub-region of a state, province, or country.

19. The network element of claim 13 wherein the national CNAM database contains calling name-type information associated with customers serviced by a carrier that owns the network element as well as calling name-type information associated with customers serviced by other carriers.

20. The network element of claim 13 wherein the national CNAM database contains calling name-type information associated with substantially all communication network customers within a specific country.

21. The network element of claim 13 wherein the national CNAM database contains calling name-type information associated with substantially all communication network customers in the United States.

22. The network element of claim 1 wherein the CNAM query routing address translation process is adapted to modify content of the CNAM query message including replacing original contents of Destination Point Code (DPC) and Subsystem (SSN) fields in the CNAM query message with the values returned by the CNAM query routing information database lookup.

23. A method for routing a Calling Name (CNAM) query message in a communications network that includes a national CNAM database, the method comprising:

(a) at a node operated by a first carrier, receiving, from a first communication network, a CNAM query message for requesting calling party name information;

(b) determining whether the requested calling party name information is contained within a local CNAM database associated with the first carrier;

(c) in response to determining that the requested calling party name Information is contained within a local CNAM database associated with the first carrier, routing the CNAM query message to the local CNAM database associated with the first carrier for further processing; and (d) in response to determining that the requested calling party name information is not contained within a local CNAM database associated with the first carrier, routing the query message to a national CNAM database for further processing.

24. The method of claim 23 wherein the CNAM query message is a Signaling System 7 (SS7) signaling message.

25. The method of claim 24 wherein the Signaling System 7 (SS7) signaling message is a Transaction Capabilities Application Part message.

26. The method of claim 23 wherein the CNAM query message is comprised of an Internet Protocol (IP) encapsulated Signaling System 7 (SS7) signaling message.

27. The method of claim 23 wherein the first communication network is a Signaling System 7 (SS7) network.

28. The method of claim 23 wherein the second communication network is an Internet Protocol (IP) network.

29. The method of claim 23 wherein the local CNAM database is owned by the first carrier.

30. The method of claim 23 wherein the local CNAM database contains calling name-type information associated with customers serviced by the first carrier.

31. The method of claim 23 wherein the local CNAM database contains calling name-type information for customers associated with a specific geographic sub-region of a state, province, or country.

32. The method of claim 23 wherein the national CNAM database contains calling name-type information associated with customers serviced by the first carrier as well as calling name-type information associated with customers serviced by carriers other than the first carrier.

33. The method of claim 23 wherein the national CNAM database contains calling name-type information associated with substantially all communication network customers within a specific country.

34. The method of claim 23 wherein the national CNAM database contains calling name-type information associated with substantially all communication network customers in the United States.

35. The method of claim 24 wherein determining whether the requested calling party name information is contained within a local CNAM database associated with the first carrier includes performing a CNAM query routing address translation database lookup operation using information contained within the CNAM query message.

36. A method of routing a Calling Name (CNAM) query message through a communications network that includes a national CNAM database node, the method comprising:

(a) at a first network element owned by a first carrier and having a first SS7 point code (PC), receiving a CNAM query message having a first SS7 destination point code (DPC) and being associated with a Calling Party (CgPA) from a first communications network;

(b) performing a primary search of an exception-based routing rules database using a CgPA identification number contained within the CNAM query message;

(c) in response to failing to locate an entry corresponding to the CgPA identification number in the exception-based routing rules database, performing a secondary search of a range-based routing rules database using the CgPA identification number contained in the CNAM query message;

(d) modifying the CNAM query to include routing address information extracted from the exception-based routing rules or the range-based routing rules database so as to route the CNAM query message to a national CNAM database node if the CgPA is not a customer of the first carrier; and (e) transmitting the modified CNAM query message into a second communications network.

37. The method of claim 36 wherein the CNAM query message is a Signaling System 7 (SS7) signaling message is a Transaction Capabilities Application Part message.

38. The method of claim 36 wherein the CNAM query message comprises an Internet Protocol (IP) encapsulated Signaling System 7 (SS7) signaling message.

39. The method of claim 36 wherein the first communications network is a Signaling System 7 (SS7) network.

40. The method of claim 36 wherein the second communications network is an Internet Protocol (IP) network.

41. The method of claim 36 wherein the second communications network includes a local CNAM database owned by the first carrier.

42. The method of claim 36 wherein the local CNAM database contains calling name-type information associated with customers serviced by the first carrier.

43. The method of claim 36 wherein the local CNAM database contains calling name-type information for customers associated with a specific geographic sub-region of a state, province, or country.

44. The method of claim 36 wherein the national CNAM database contains calling name-type information associated with customers serviced by the first carrier as well as calling name-type information associated with customers serviced by carriers other than the first carrier.

45. The method of claim 36 wherein the national CNAM database contains calling name-type information associated with substantially all communication network customers within a specific country.

46. The method of claim 36 wherein the national CNAM database contains calling name-type information associated with substantially all communication network customers in the United States.

47. The method of claim 36 wherein the exceptions-based routing rules database includes records for customers that have been ported into or ported out of a network owned by the first carrier.

48. The method of claim 36 wherein the first SS7 destination point code is equal to the first SS7 point code.

49. The method of claim 36 wherein the routing address information incorporated within the CNAM query message includes an IP network address.

50. The method of claim 36 wherein the routing address information incorporated within the CNAM query message includes an SS7 network address.

51. A network element for processing and routing calling name (CNAM) service related messages through a communications network that includes a national CNAM database, the network element comprising:

(a) a communication module capable of transmitting to and receiving from a communications network query and response messages associated with CNAM service; and (b) a CNAM query routing address translation process for:

(i) determining whether a CNAM query message can be processed by a local CNAM database or a national CNAM database, (ii) in response to determining that local CNAM database processing is required, routing the query message to a local CNAM database, and (iii) in response to determining that national CNAM database processing is required, routing the query message to a national CNAM database.

52. The network element of claim 51 wherein the CNAM query and response messages are Signaling System 7 (SS7) Transaction Capabilities Application Part messages.

53. The network element of claim 51 wherein the communications network is a Signaling System 7 (SS7) network.

54. The network element of claim 51 wherein the communications network is an Internet Protocol (IP) network.

55. The network element of claim 51 wherein the CNAM query and response messages are IP encapsulated Signaling System 7 (SS7) Transaction Capabilities Application Part messages.

56. The network element of claim 51 wherein the communication module is a Signaling System 7 (SS7) Link Interface Module (LIM).

57. The network element of claim 51 wherein the communication module is an Internet Protocol (IP) Database Communication Module (DCM).

58. The network element of claim 51 wherein the local CNAM database is owned by a carrier that owns the network element.

59. The network element of claim 51 wherein the local CNAM database contains calling name-type information associated with customers serviced by a carrier that owns the network element.

60. The network element of claim 51 wherein the local CNAM database contains calling name-type information for customers associated with a specific geographic sub-region of a state, province, or country.

61. The network element of claim 51 wherein the national CNAM database contains calling name-type information associated with customers serviced by a carrier that owns the network element as well as calling name-type information associated with customers serviced by carriers other than the carrier that owns the network element.

62. The network element of claim 51 wherein the national CNAM database contains calling name-type information associated with substantially all communication network customers within a specific country.

63. The network element of claim 51 wherein the national CNAM database contains calling name-type information associated with substantially all communication network customers in the United States.

64. The network element of claim 51 wherein determining whether to route the CNAM query message to a local CNAM database or the national CNAM database includes using information associated with the calling party (CgPA) that is contained within the CNAM query message.

65. The network element of claim 64 wherein the information associated with the called party is a number contained in a Calling Party Address (CgPA:ADD) field of the CNAM query message.

66. The network element of claim 64 wherein the CNAM query routing address translation process is adapted to route the CNAM query message to a local CNAM database if the CgPA is associated with a customer of the carrier that owns the network element.

67. The network element of claim 64 wherein the CNAM query routing address translation process is adapted to route CNAM query message to the national CNAM database if the CgPA is not associated with a customer of the carrier that owns the network element.

68. A computer-readable medium having stored thereon a national CNAM database, the national CNAM database comprising:

(a) a plurality of first data fields containing directory numbers of subscribers of a plurality of telephone service providers in a given country; and (b) a plurality of second data fields respectively corresponding to the first data fields containing calling name information for each of the subscribers.

69. The computer readable medium of claim 68 wherein the plurality of first data fields contain directory numbers for subscribers of substantially all of the telephone network service providers in the country.

70. The computer readable medium of claim 69 wherein the calling name information contained in each of the plurality of second data fields includes a name for a calling party.

71. The computer readable medium of claim 69 wherein the calling name information contained in each of the plurality of second data fields includes a city for a calling party.

72. The computer readable medium of claim 69 wherein the calling name information contained in each of the plurality of second data fields includes a state for a calling party.

73. The computer readable medium of claim 69 wherein the calling name information contained in each of the plurality of second data fields includes a province for a calling party.

74. A national calling name database embodied in a computer-readable medium and containing calling name information for a plurality of telephone network subscribers, the national calling name database comprising:

(a) a subscriber table containing name information accessible using at least a first portion of a directory number;

(b) a city table containing city information accessible using at least a second portion of the calling party directory number different from the first portion;

(c) a state table containing state information accessible using at least a third portion of the calling party directory number different from the first and second portions; and (d) a search engine operatively associated with the subscriber, city, and state tables for responding to queries for calling name information and extracting information from the tables based on the queries.

75. The national calling name database of claim 74 wherein the search engine is adapted to search the subscriber table using the first portion of the calling party directory number, and, in response to failing to locate an entry in the subscriber table, searching the city table using the second portion of the calling party directory number.

76. The national calling name database of claim 75 wherein the search engine is adapted to search the state table using the third portion of the calling party number in response to failing to locate an entry in the city table.

77. The national calling name database of claim 74 wherein the first portion is the entire calling party directory number, the second portion is the first six digits of the calling party directory number, and the third portion is the first three digits of the calling party directory number.

* * * * *